United States Patent
Cho et al.

(10) Patent No.: US 12,096,319 B2
(45) Date of Patent: Sep. 17, 2024

(54) METHOD BY WHICH FIRST DEVICE TRANSMITS MESSAGE IN WIRELESS COMMUNICATION SYSTEM SUPPORTING SIDELINK, AND DEVICE THEREFOR

(71) Applicant: LG ELECTRONICS INC., Seoul (KR)

(72) Inventors: Sungdong Cho, Seoul (KR); Hakseong Kim, Seoul (KR); Myoungseob Kim, Seoul (KR); Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 17/923,439

(22) PCT Filed: May 19, 2020

(86) PCT No.: PCT/KR2020/006516
§ 371 (c)(1),
(2) Date: Nov. 4, 2022

(87) PCT Pub. No.: WO2021/235565
PCT Pub. Date: Nov. 25, 2021

(65) Prior Publication Data
US 2023/0199448 A1 Jun. 22, 2023

(51) Int. Cl.
*H04W 4/44* (2018.01)
*G08G 1/16* (2006.01)
*H04W 4/021* (2018.01)

(52) U.S. Cl.
CPC ................ *H04W 4/44* (2018.02); *G08G 1/16* (2013.01); *H04W 4/021* (2013.01)

(58) Field of Classification Search
CPC .......... H04W 4/44; H04W 4/021; G08G 1/16
See application file for complete search history.

(56) References Cited

U.S. PATENT DOCUMENTS 11,388,553 B2 * 7/2022 Arai ..................... H04W 4/021
2018/0301033 A1 10/2018 Oshida
(Continued)

FOREIGN PATENT DOCUMENTS

| KR | 1020110094982 A | 8/2011 |
| KR | 1020190115278 A | 10/2019 |

OTHER PUBLICATIONS

"Intelligent Transport System (ITS); Vulnerable Road Users (VRU) awareness; Part 2: Functional Architecture and Requirements definition; Release 2", ETSI TS 103 300-2 V2.1.1 (May 2020). May 7, 2020.

*Primary Examiner* — Mohamed Barakat
(74) *Attorney, Agent, or Firm* — BRYAN CAVE LEIGHTON PAISNER LLP

(57) ABSTRACT

Disclosed are a method by which a first device transmits a message in a wireless communication system supporting sidelink, and a device therefor according to various embodiments. The method comprises: a step in which the first device receives a first safety message from a second device; a step of evaluating a collision risk on the basis of the first safety message and generating first event information on the basis of the collision risk evaluation; and a step of transmitting a threat notification message (TNM) including identification information of the second device and the first event information, wherein when the first safety message is a personal safety message (PSM), the threat notification message further includes information on a first risk region determined in response to the first event information.

14 Claims, 26 Drawing Sheets

(56) References Cited

U.S. PATENT DOCUMENTS

| | | |
|---|---|---|
| 2018/0310147 A1 | 10/2018 | Kim et al. |
| 2019/0043357 A1* | 2/2019 | Stinnett ............ G08G 1/096791 |
| 2020/0115863 A1* | 4/2020 | Kozloski .............. G05D 1/0088 |
| 2020/0273339 A1* | 8/2020 | Tohriyama ........ B60W 30/0953 |
| 2020/0401963 A1* | 12/2020 | Matuchniak ............ H04L 51/04 |
| 2021/0188289 A1* | 6/2021 | Oba ..................... G06V 20/597 |

\* cited by examiner

FIG. 9
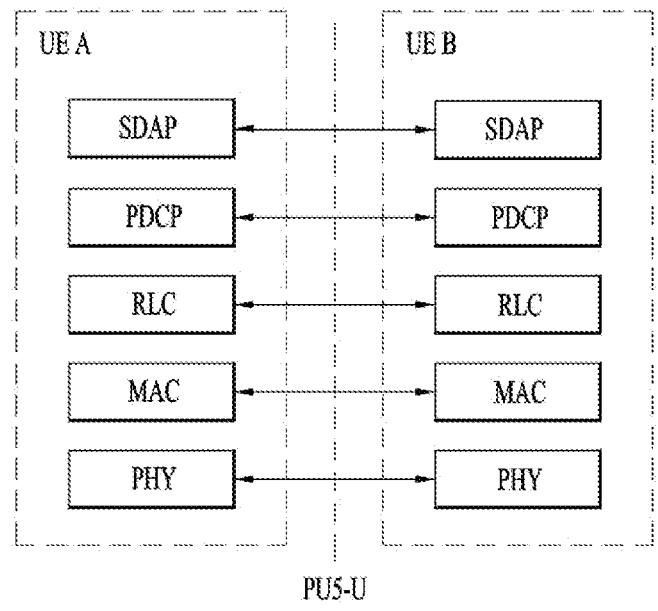
(a)
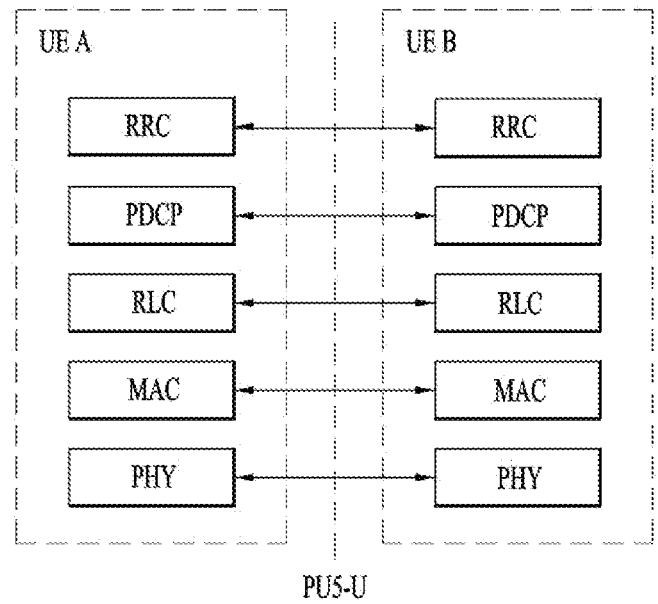
(b)

FIG. 13
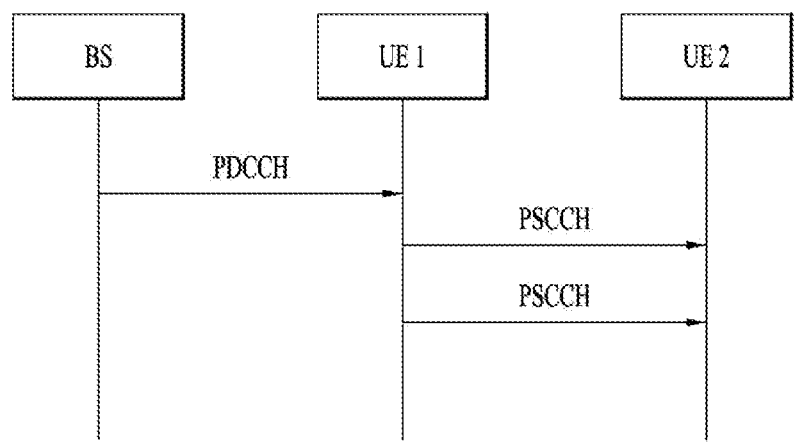
(a)
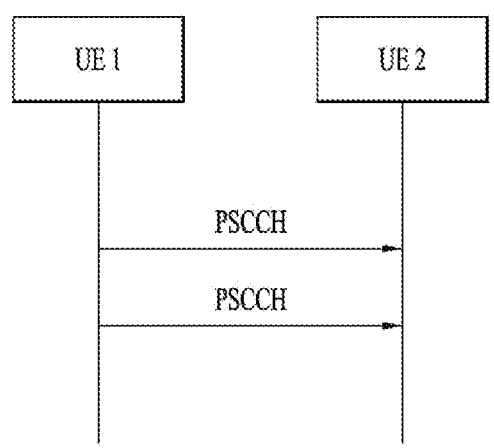
(b)

METHOD BY WHICH FIRST DEVICE TRANSMITS MESSAGE IN WIRELESS COMMUNICATION SYSTEM SUPPORTING SIDELINK, AND DEVICE THEREFOR

This application is the National Stage filing under 35 U.S.C. 371 of International Application No. PCT/KR2020/006516 filed on May 19, 2020, the contents of which is hereby incorporated by reference herein in its entirety.

TECHNICAL FIELD

The present disclosure relates to a method of transmitting a message by a first device in a wireless communication system for supporting sidelink, and particularly to a method for transmitting a threat notification message related to V2X by a first device and a device for the method.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X can be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed.

The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

An object of the present disclosure is to provide a method of overcoming mismatch of prediction of a risk due to a difference in computational and processing capability and minimizing battery consumption by transmitting a TNM message using GeoCasting with a network and/or providing a threat notification message (TNM) including area information for a collision risk or minimizing data traffic by integrating TNM messages for a plurality of devices.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

According to an aspect, a method of transmitting a message by a first device in a wireless communication system for supporting sidelink includes receiving a first safety message from a second device, evaluating a collision risk based on the first safety message and generating first event information based on evaluation of the collision risk, and transmitting a threat notification message (TNM) including identification information of the second device and the first event information, wherein, when the first safety message is a personal safety message (PSM), the threat notification message further includes information on the first dangerous area determined in response to the first event information.

The threat notification message may be included in a vehicle to network (V2N) message related to GeoCasting and may be transferred to the second device through a network, and the V2N message may include information on the first dangerous area as GeoNWHeader.

The first device may determine whether to transmit the threat notification message through the vehicle to network (V2N) message based on indication information related to reception of the TNM included in the first safety message.

The first device may transmit the threat notification message to the second device using each of the vehicle to network (V2N) message and the sidelink.

When the first safety message is a cooperative awareness message (CAM) of a vehicle, the threat notification message may not include information on the first dangerous area.

The threat notification message may be transmitted in any one of a maneuver coordination message (MCM), a cooperative awareness message (CAM), and a decentralized environmental notification message (DENM).

The first dangerous area may be determined as an area having a radius determined based on mobility information of the first device and mobility information for the second device, included in the first safety message.

The method may further include receiving a second safety message from a third device and generating second event information of the second safety message, and when a second dangerous area corresponding to the second event information and the first dangerous area overlap, integrating the first dangerous area and the second dangerous area.

The threat notification message may include identification information of the second device, identification information of the third device, and integrated dangerous area information including both the first dangerous area and the second dangerous area.

A size of a range of the integrated dangerous area may be corrected based on a reception timing interval between the first safety message and the second safety message.

A size of a range of the integrated dangerous area may be corrected based on a surrounding environment related to the first dangerous area and the second dangerous area.

The threat notification message may include a TNM CoreData frame, a target list frame, and an optional container frame, and information on the first dangerous area may be included in the optional container frame.

According to another aspect, a first device for transmitting a message in a wireless communication system for supporting sidelink includes a radio frequency (RF) transceiver, and a processor connected to the RF transceiver, wherein the processor receives a first safety message from a second device using the RF transceiver, evaluates a collision risk based on the first safety message and generates first event information based on evaluation of the collision risk, and transmits a threat notification message (TNM) including identification information of the second device and the first event information using the RF transceiver, and when the first safety message is a personal safety message (PSM), the threat notification message further includes information on the first dangerous area determined in response to the first event information.

According to another aspect, a chip set for transmitting a message in a wireless communication system for supporting sidelink includes at least one processor, and at least one processor operatively connected to the at least one processor and configured to cause the at least one processor to perform an operation when being executed, wherein the operation includes receiving a first safety message from a second device using the RF transceiver, evaluating a collision risk based on the first safety message and generating first event information based on evaluation of the collision risk, and transmitting a threat notification message (TNM) including identification information of the second device and the first event information using the RF transceiver, wherein, when the first safety message is a personal safety message (PSM), the threat notification message further includes information on the first dangerous area determined in response to the first event information.

The processor may control a driving mode of a device connected to the chip set based on the first safety message.

Various embodiments may overcome mismatch of prediction of a risk due to a difference in computational and processing capability and may minimize battery consumption by transmitting a TNM message using GeoCasting with a network and/or providing a threat notification message (TNM) including area information for a collision risk or may minimize data traffic by integrating TNM messages for a plurality of devices.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 9 illustrates a radio protocol architecture for SL communication.

FIG. 13 illustrates a procedure in which UEs perform V2X or SL communication according to a transmission mode.

DETAILED DESCRIPTION

Figure 1:
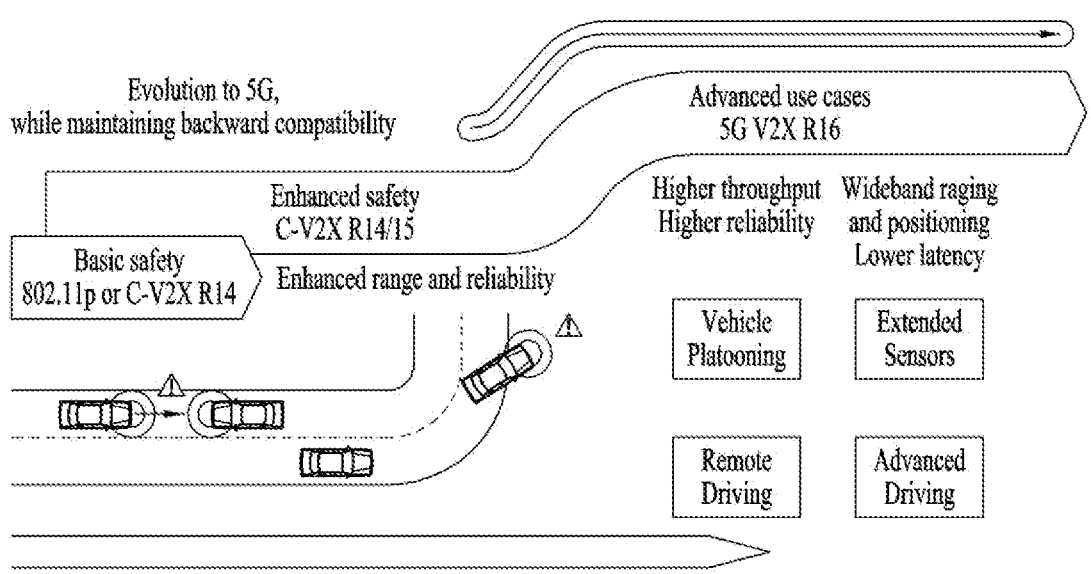
FIG. 1 is a diagram for explaining by comparing V2X communication based on RAT before NR and V2X communication based on NR

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR can utilize all available spectrum resources, from low frequency bands below 1 GHz to intermediate frequency bands from 1 GHz to 10 GHz and high frequency (millimeter wave) bands above 24 GHz.

Figure 2:
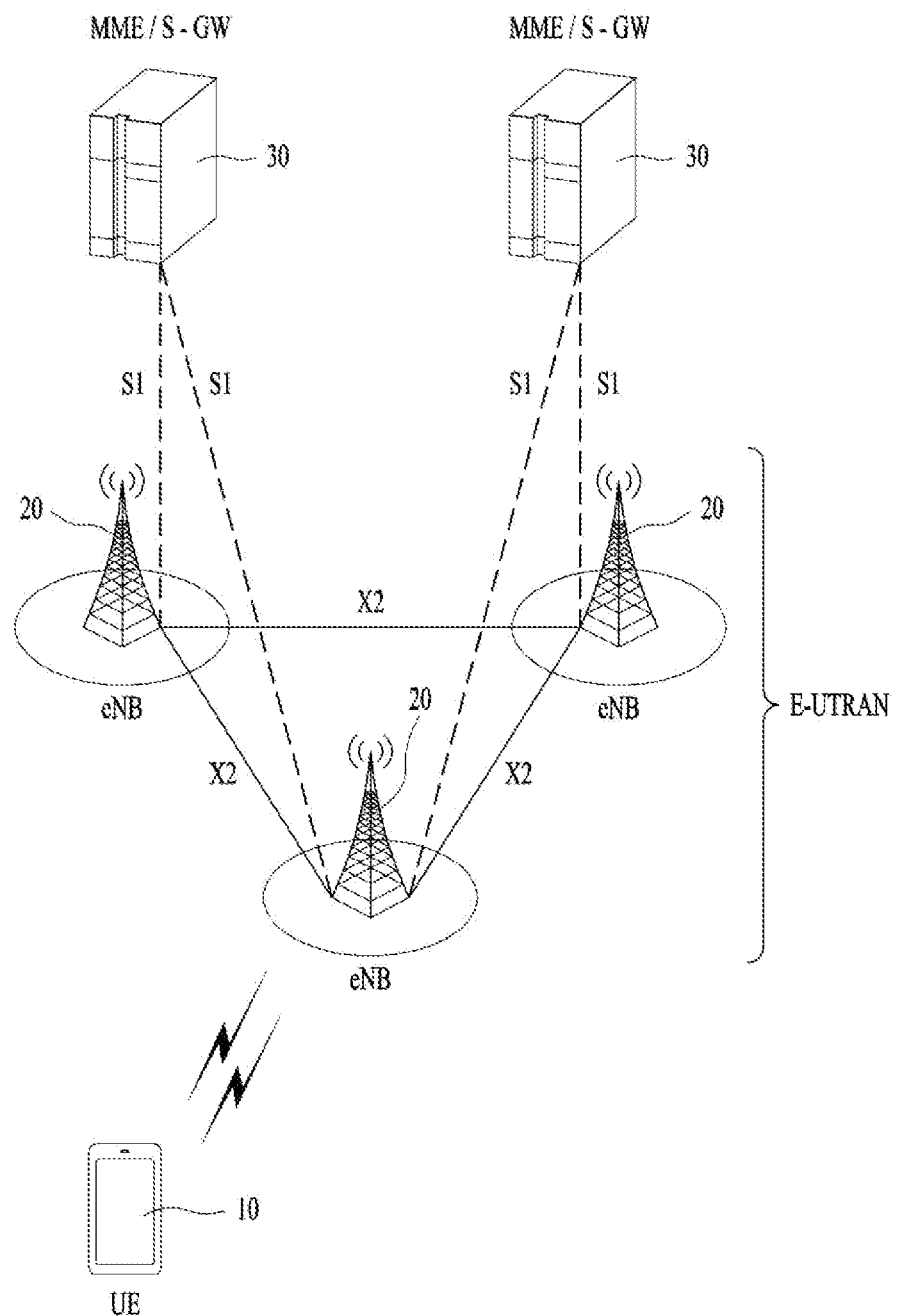
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
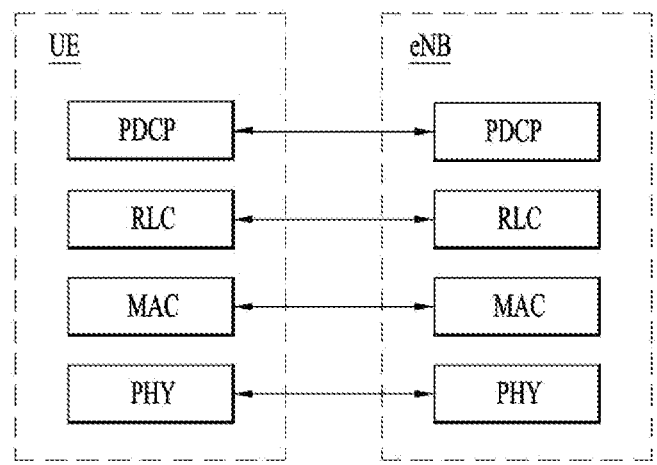
FIG. 3 illustrates a user-plane radio protocol architecture to which embodiment(s) are applicable.

FIG. 3 illustrates a user-plane radio protocol architecture to which the present disclosure is applicable.

Figure 4:
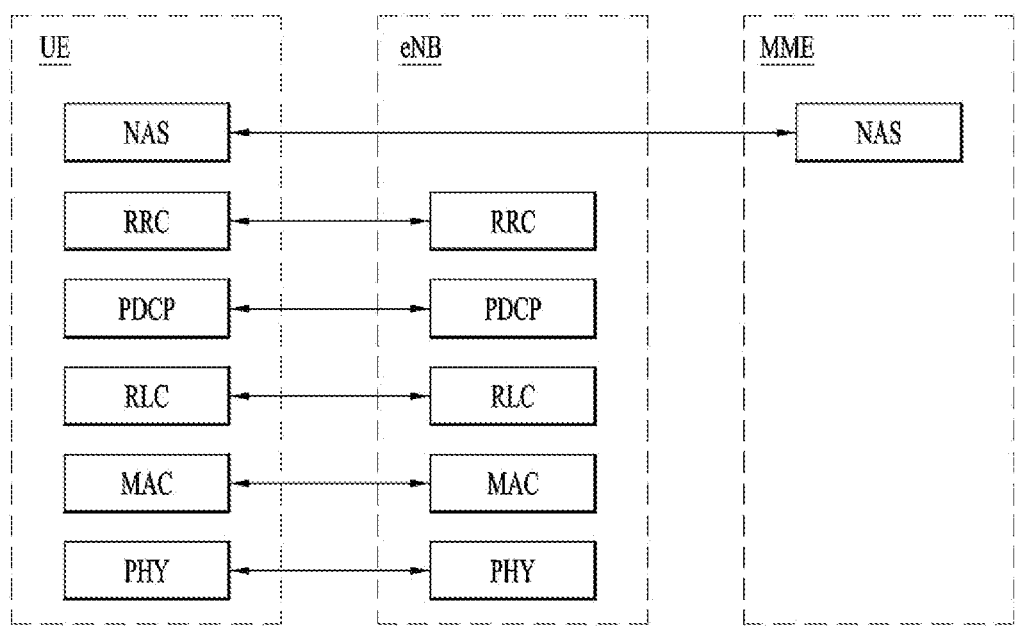
FIG. 4 illustrates a control-plane radio protocol architecture to which embodiment(s) are applicable.

FIG. 4 illustrates a control-plane radio protocol architecture to which the present disclosure is applicable. A user plane is a protocol stack for user data transmission, and a control plane is a protocol stack for control signal transmission.

Referring to FIGS. 3 and 4, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel A transmission time interval (TTI) is a unit time for subframe transmission.

Figure 5:
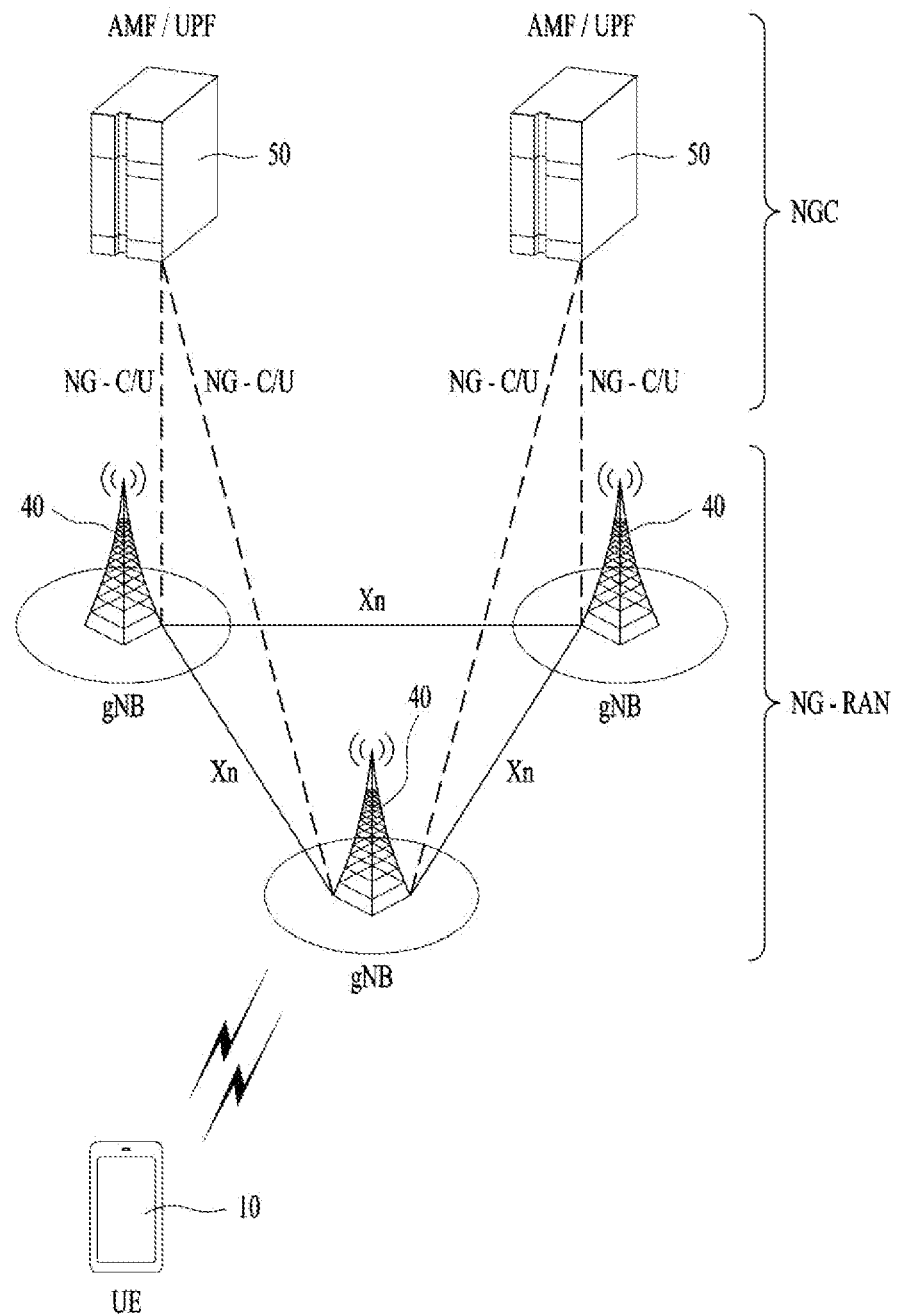
FIG. 5 illustrates the structure of an NR system to which embodiment(s) are applicable.

FIG. 5 illustrates the structure of a NR system to which the present disclosure is applicable.

Referring to FIG. 5, a next generation radio access network (NG-RAN) may include a next generation Node B (gNB) and/or an eNB, which provides user-plane and control-plane protocol termination to a UE. In FIG. 5, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 6:
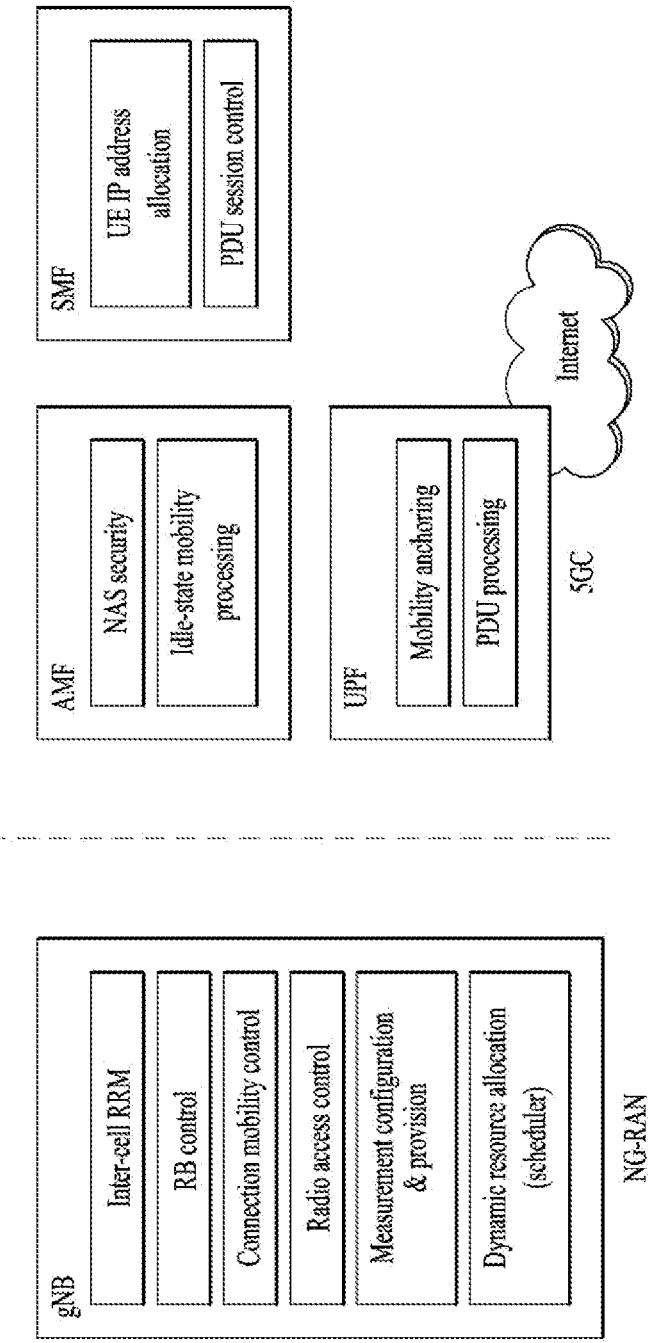
FIG. 6 illustrates functional split between an NG-RAN and a 5GC to which embodiment(s) are applicable.

FIG. 6 illustrates functional split between the NG-RAN and the 5GC to which the present disclosure is applicable.

Referring to FIG. 6, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 7:
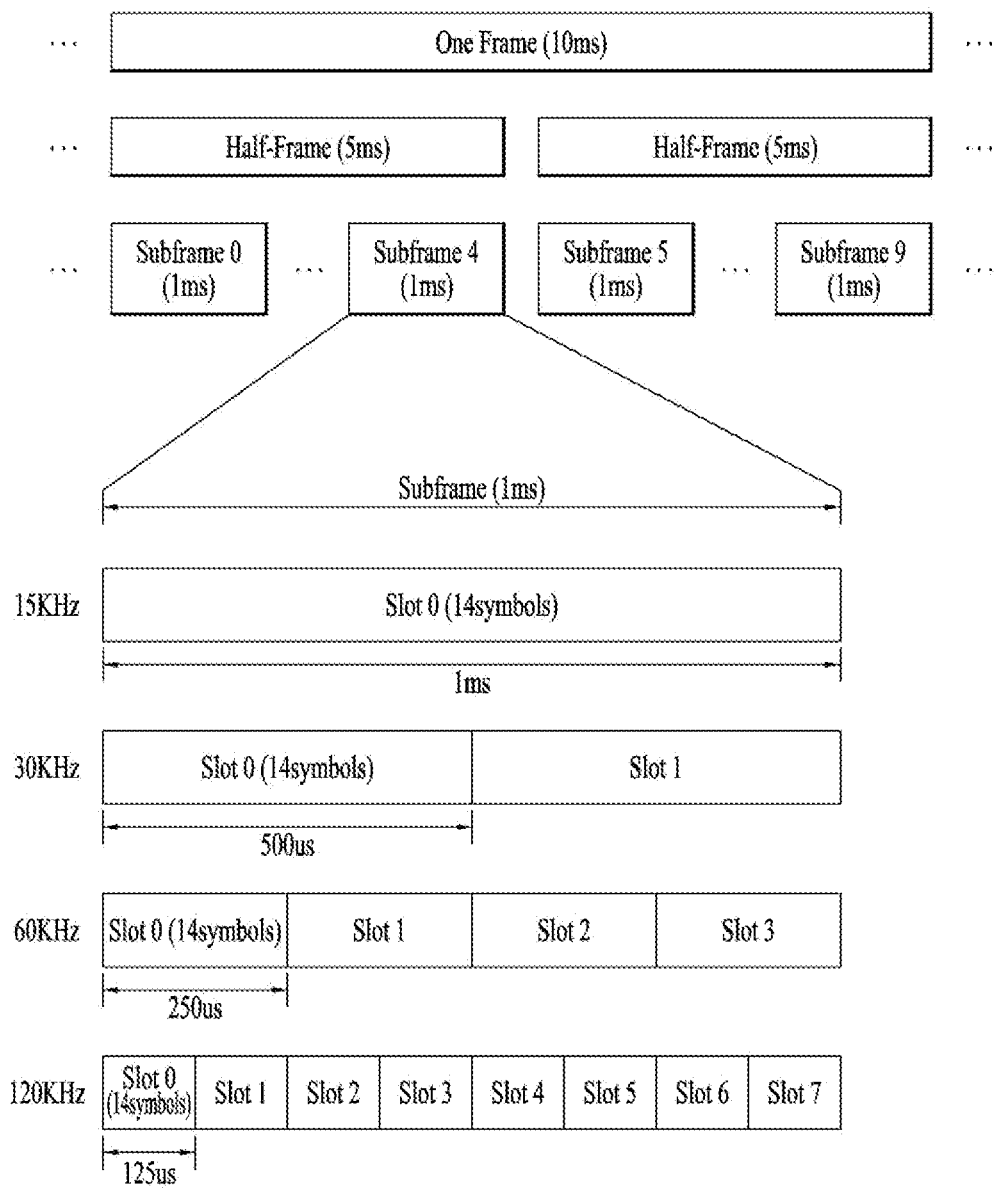
FIG. 7 illustrates the structure of an NR radio frame to which embodiment(s) are applicable.

FIG. 7 illustrates the structure of a NR radio frame to which the present disclosure is applicable.

Referring to FIG. 7, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 8:
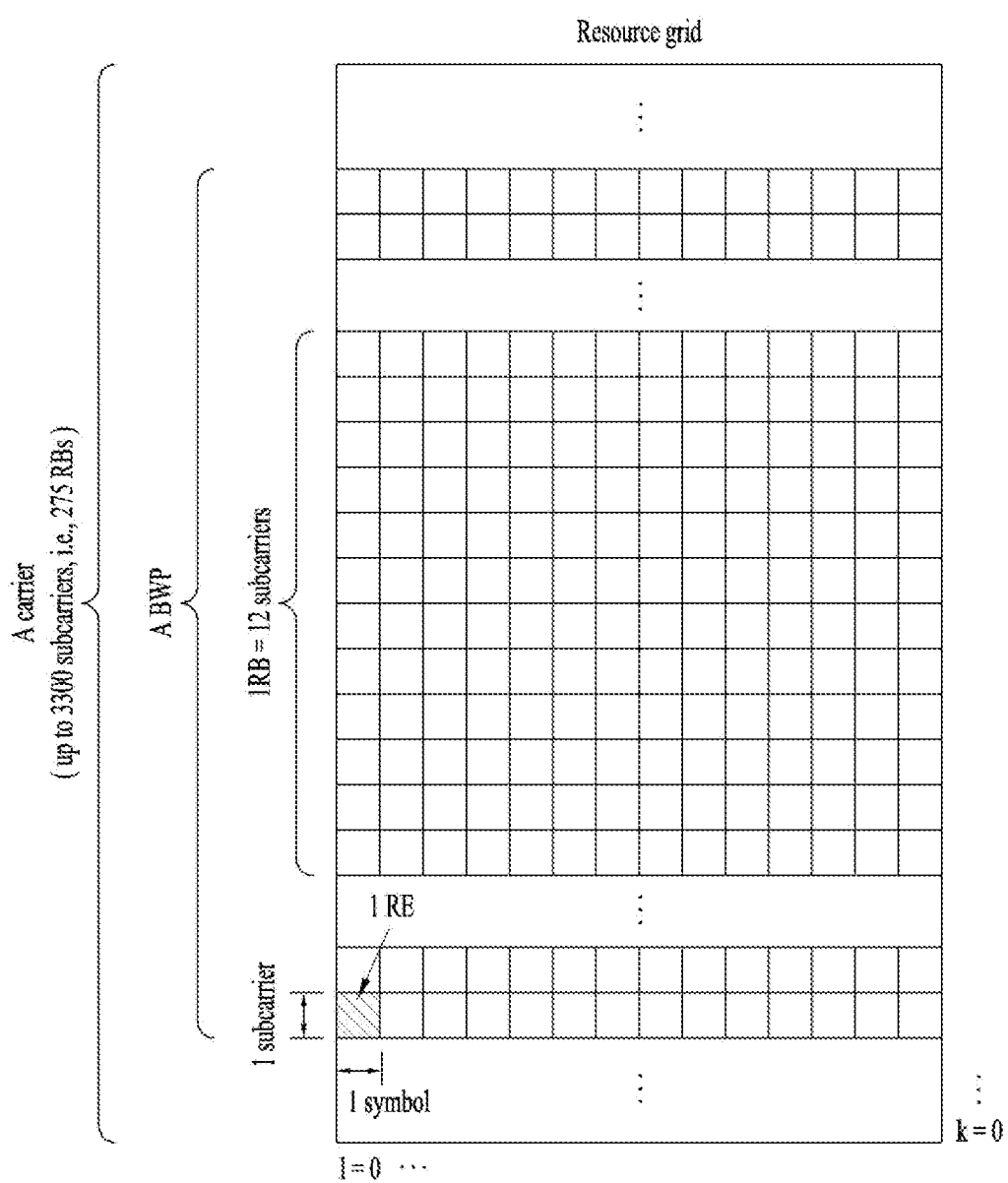
FIG. 8 illustrates the slot structure of an NR frame to which embodiment(s) are applicable.

FIG. 8 illustrates the slot structure of a NR frame to which the present disclosure is applicable.

Referring to FIG. 8, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE), and one complex symbol may be mapped thereto.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

FIG. 9 illustrates a radio protocol architecture for SL communication. Specifically, FIG. 9-(a) shows a user plane protocol stack of NR, and FIG. 9-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 10:
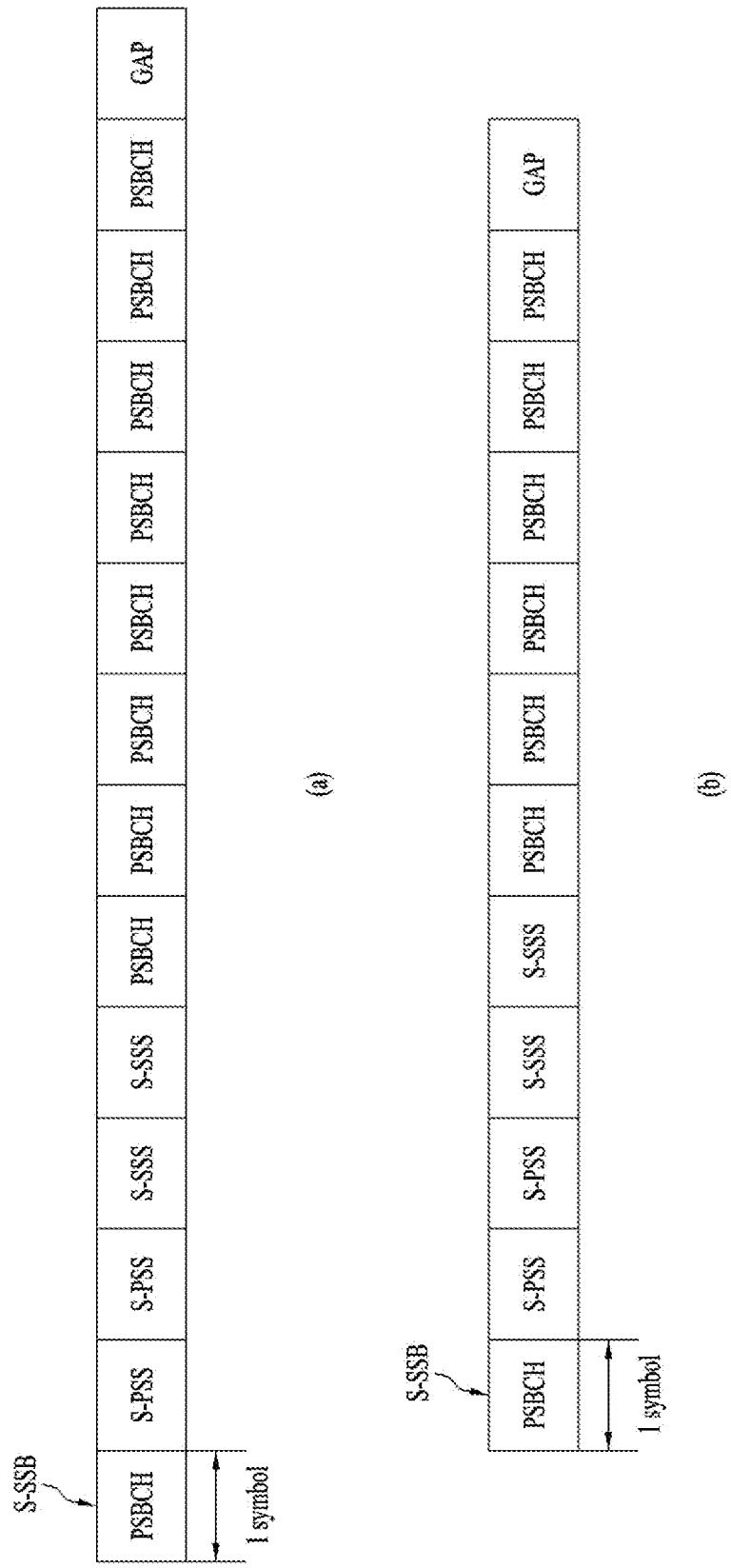
FIG. 10 shows the structures of an S-SSB according to CP types.

FIG. 10 illustrates the structures of an S-SSB according to CP types. FIG. 10-(a) shows the structure of the S-SSB when the CP type is NCP.

Figure 20:
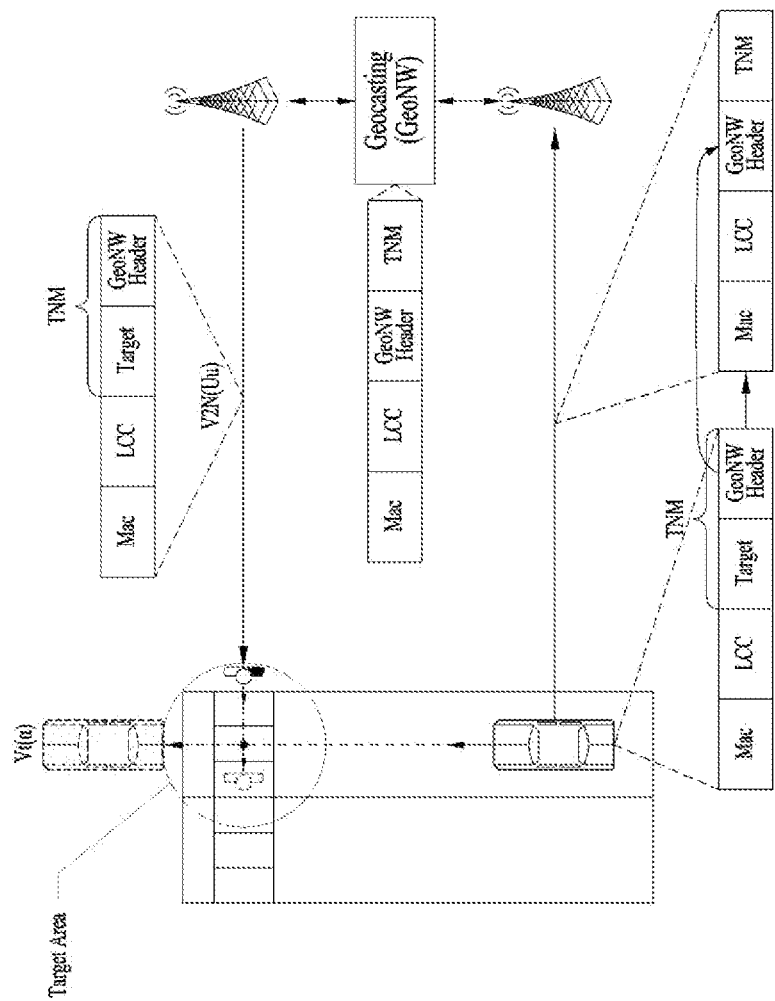
FIG. 20 is a diagram for explaining a method of transmitting a TNM through a network by a V2X device.

For example, the structure of the S-SSB, that is, the order of symbols to which the S-PSS, S-SSS, and PSBCH are mapped in the S-SSB transmitted by the transmitting UE when the CP type is NCP may be shown in FIG. 20.

FIG. 10-(b) shows the structure of the S-SSB when the CP type is ECP.

For example, when the CP type is ECP, the number of symbols to which the transmitting UE maps the PSBCH after the S-SSS in the S-SSB may be 6, unlike in FIG. 20. Accordingly, the coverage of the S-SSB may differ between the CP types, NCP and ECP.

Each SLSS may have an SL synchronization identifier (SLSS ID).

For example, in the case of LTE SL or LTE V2X, the value of the SLSS ID may be defined based on a combination of two different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on a combination of two different S-PSS sequences and 336 different S-SSS sequences. For example, the number of SLSS IDs may be 672. For example, the value of the SLSS ID may be any one of 0 to 671. For example, one S-PSS of the two different S-PSSs may be associated with in-coverage, and the other S-PSS may be associated with out-of-coverage. For example, SLSS IDs of 0 to 335 may be used in in-coverage, and SLSS IDs of 336 To 671 may be used in out-of-coverage.

In order to improve the S-SSB reception performance of the receiving UE, the transmitting UE needs to optimize the transmit power according to the characteristics of respective signals constituting the S-SSB. For example, according to the peak to average power ratio (PAPR) of each signal constituting the S-SSB, the transmitting UE may determine the value of maximum power reduction (MPR) for each signal. For example, when the PAPR differs between the S-PSS and the S-SSS which constitute the S-SSB, the transmitting UE may apply an optimal MPR value to transmission of each of the S-PSS and the S-SSS in order to improve the S-SSB reception performance of the receiving UE. Also, for example, in order for the transmitting UE to perform an amplification operation on each signal, a transition period may be applied. The transition period may reserve a time required for the transmitter amplifier of the transmitting UE to perform a normal operation at the boundary where the transmit power of the transmitting UE varies. For example, in the case of FR1, the transition period may be 10 μs. For example, in the case of FR2, the transition period may be 5 μs. For example, a search window in which the receiving UE is to detect the S-PSS may be 80 ms and/or 160 ms.

Figure 11:
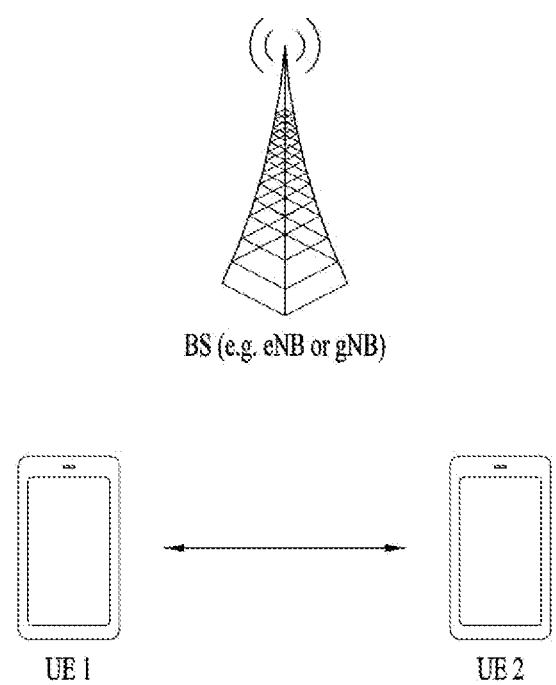
FIG. 11 illustrates UEs performing V2X or SL communication.

FIG. 11 illustrates UEs performing V2X or SL communication.

Referring to FIG. 11, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 12:
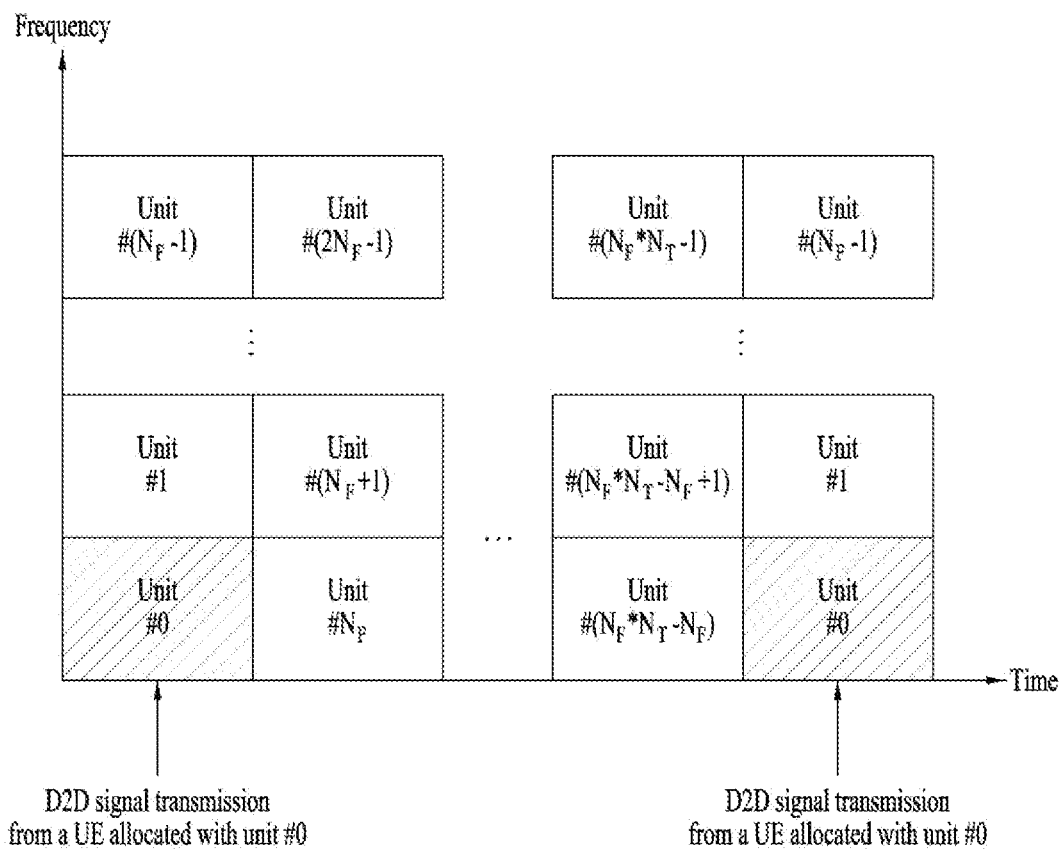
FIG. 12 illustrates resource units for V2X or SL communication.

FIG. 12 illustrates resource units for V2X or SL communication.

Referring to FIG. 12, the frequency resources of a resource pool may be divided into NF sets, and the time resources of the resource pool may be divided into NT sets. Accordingly, a total of NF*NT resource units may be defined in the resource pool. FIG. 12 shows an exemplary case where the resource pool is repeated with a periodicity of NT subframes.

As shown in FIG. 12, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

FIG. 13 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 13-(a) illustrates a UE operation related to LTE transmission mode 1 or LTE transmission mode 3. Alternatively, for example, FIG. 24-(a) illustrates a UE operation related to NR resource allocation mode 1. For example, LTE transmission mode 1 may be applied to general SL communication, and LTE transmission mode 3 may be applied to V2X communication.

For example, FIG. 13-(b) illustrates a UE operation related to LTE transmission mode 2 or LTE transmission mode 4. Alternatively, for example, FIG. 24-(b) illustrates a UE operation related to NR resource allocation mode 2.

Referring to FIG. 13-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may represent a slot offset between DCI reception and a first SL transmission scheduled by DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type SA, and the NR SL module may deliver LTE DCI type SA to the LTE SL module in units of X ms. For example, the LTE SL module may apply activation and/or release to the first LTE subframe Z ms after the LTE SL module receives LTE DCI format SA from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 13-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 14:
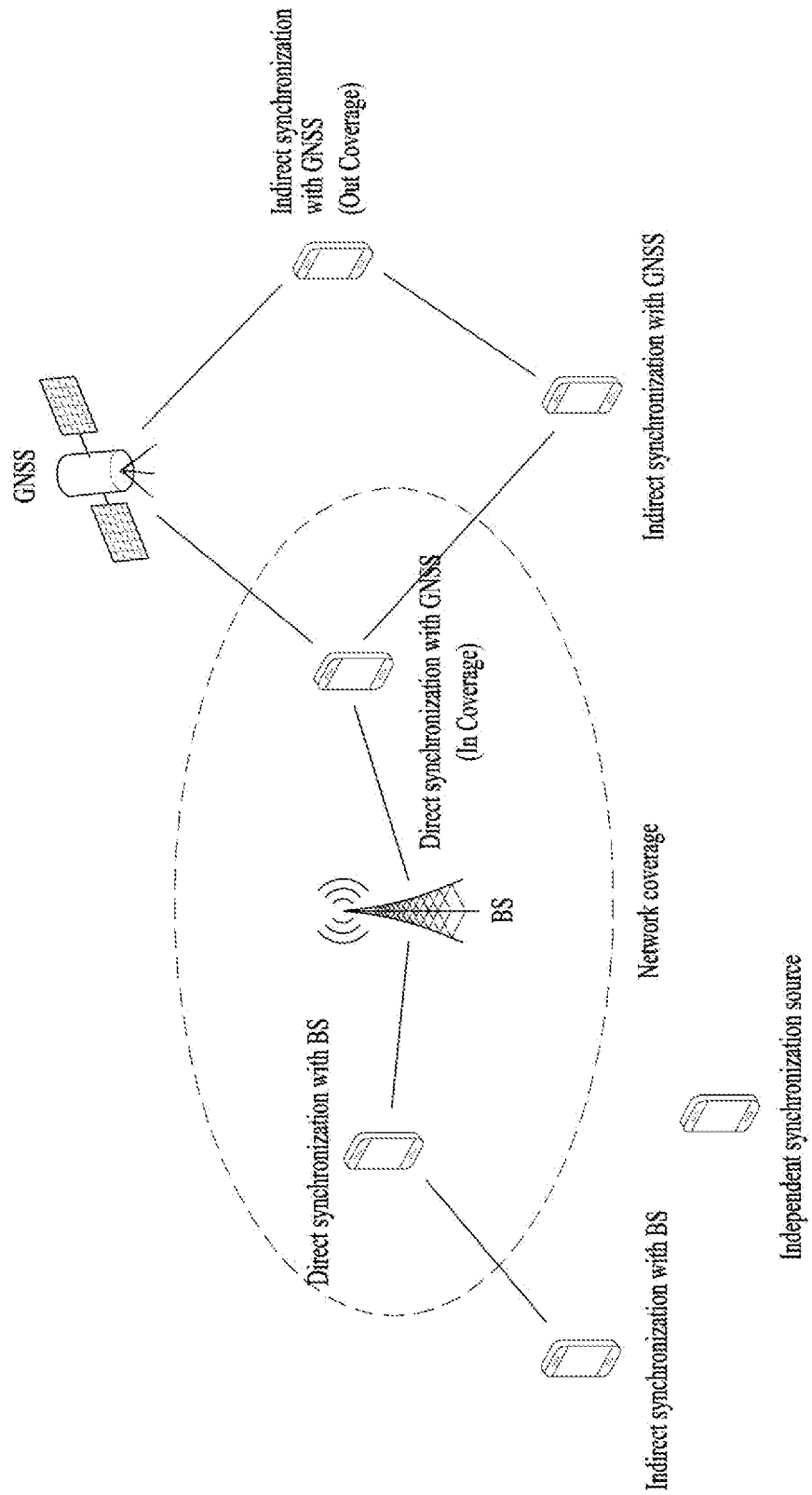
FIG. 14 illustrates a V2X synchronization source or synchronization reference to which embodiments(s) are applicable.

FIG. 14 illustrates a V2X synchronization source or reference to which the present disclosure is applicable.

Referring to FIG. 14, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Tables 5 and 6. Tables 5 and 6 are merely an example, and the relationship between synchronization sources and synchronization priorities may be defined in various manners.

TABLE 5

| Priority | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) with low priority | Remaining UE(s) with low priority |

In table 5 or table 6, YU may denote the highest priority, and P6 may denote the lowest priority. In Table 5 or Table 6, the BS may include at least one of a gNB or an eNB.

Whether to use GNSS-based synchronization or BS-based synchronization may be (pre)determined. In a single-carrier operation, the UE may derive its transmission timing from an available synchronization reference with the highest priority.

Tx/Rx Beam Sweep

When a very high frequency such as mmWave is used, beamforming may be generally used in order to overcome a pathloss. In order to use beamforming, the best beam pair should be detected from among several beam pairs between a transmitter and a receiver. This operation may be called beam acquisition or beam tracking from the receiver perspective. In particular, analog beamforming is used for mmWave. Accordingly, in the operation of beam acquisition or beam tracking, a vehicle needs to perform beam sweeping of switching between beams in different directions at different times, using an antenna array thereof.

Figure 15:
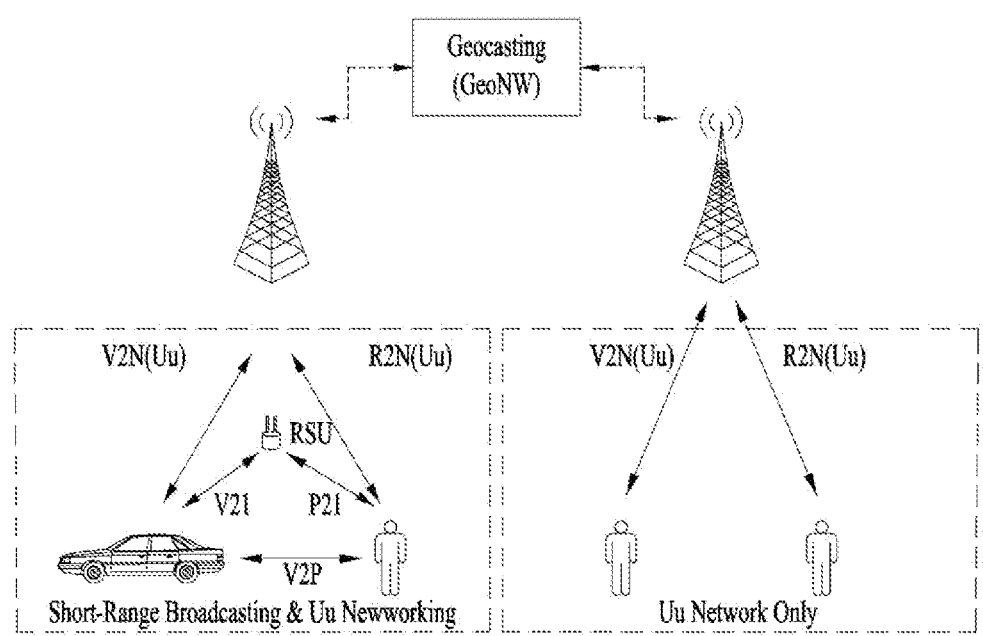
FIGS. 15 and 16 are diagram for explaining the configuration of a system related to a V2X device.
Figure 16:
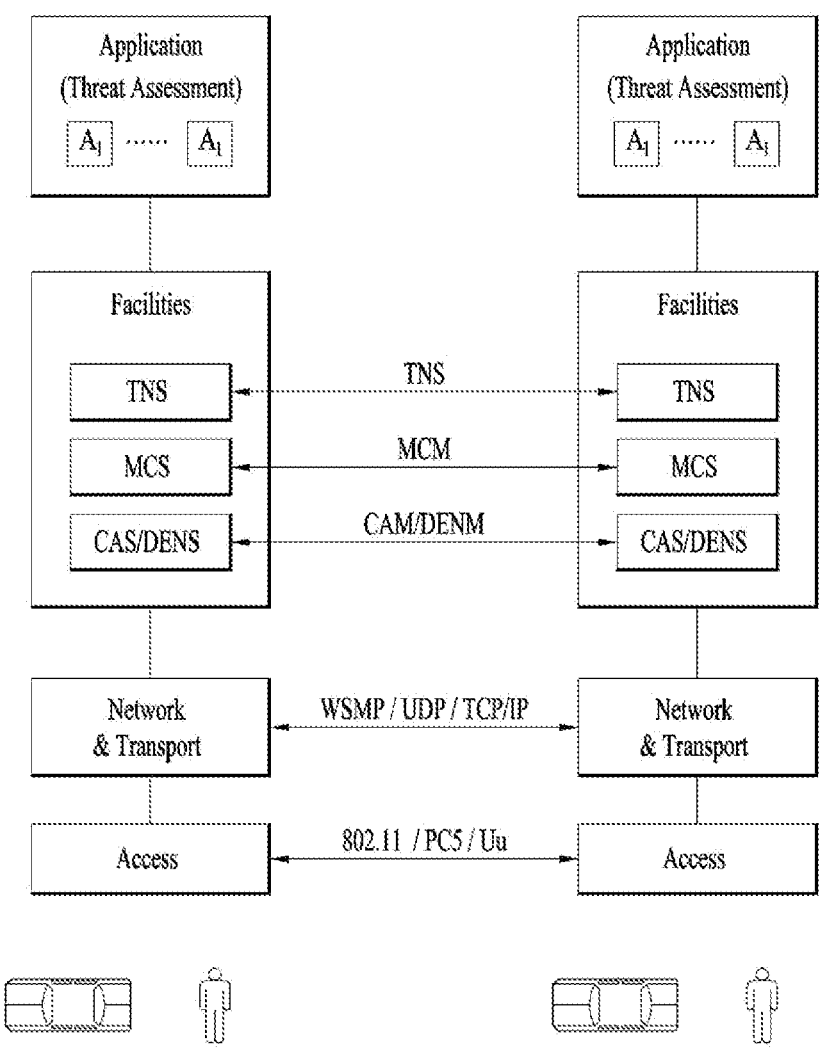

FIGS. 15 and 16 are diagram for explaining the configuration of a system related to a V2X device.

Referring to FIG. 15, a V2X device (a UE, a vehicle, an RSU, or a VRU) may perform short-range broadcasting through PC5/DSRC, may perform V2N communication through Uu, and may use GeoCasting and RSU message forwarding for compatibility with short-distance communication.

Referring to FIG. 16, a threat notification service (TNS) may configure a facility layer together with MCS/CAS/DENS or may be included as a subframe of MCM/CAM/DENM.

In detail, the system may include an access layer, a network & transport layer, a facility layer, an entity for security and management, and an application layer at a top level.

The application layer may play a supporting role by actually implementing various use-cases and may support a service related to threat assessment.

The facility layer may be a layer that supports an operation of the application layer (mainly, generation of a message for V2X, transmission and reception with a lower layer, and management thereof). The facility layer may include a facility layer for a threat notification service (TNS), a facility layer for a cooperative awareness basic service (CAS)/decentralized environmental notification basic service (DENS), and a facility layer for a manager coordination basic service (MCS). The facility layer for the TNS may transfer information related to collision risk through a threat notification message (TNM), the facility layer for the MCS may transfer information related to vehicle maneuvering through a maneuver coordination message (MCM), and the facility layer for the CAS/DENS may transfer surrounding environment information and driving information through a cooperative awareness message (CAM) and a decentralized environmental notification message (DENM). A facility entity for new services such as cooperative adaptive cruise control (CACC), platooning, vulnerable roadside user (VRU), and collective perception service (CPS) and related messages may be further defined.

The transport layer may be a connection layer that transfers a service message and related information provided from a higher layer (a session layer, a presentation layer, and an application layer) and a lower layer (a network layer, a data link layer, and a physical layer). The transport layer may manage data transmitted by the application of a transmitting V2X device to accurately arrive in an application process of the V2X device as a destination. As shown in FIG. 15, a transport protocol may be a protocol for TCP, UDP, IP, WAVE Short Message Protocol (WSMP), or the like.

The network layer may determine a logical address and packet forwarding method/path, etc., and may add information such as the logical address and forwarding path/method of a destination to a packet provided from the transport layer to a header of the network layer. As an example of the packet method, unicast, broadcast, multicast, etc. between V2X devices may be considered. A networking protocol for V2X devices may be considered in various ways, such as GeoNetworking, IPv6 networking with mobility support, and IPv6 over GeoNetworking. The GeoNetworking protocol may apply various transfer paths or transfer ranges, such as forwarding using location information of V2X devices including vehicles, or forwarding using the number of forwarding hops, as well as simple packet transmission.

As described above, vehicle driving information, risk information, etc. may be provided by transmitting a V2X message according to a system configuration defined in relation to the V2X device. In this case, through the information transferred as the V2X message, all information of the vehicle or VRU may not be transmitted, and only information limited to a mutually agreed V2X message may be shared as described above. In this case, asymmetry between the limited information defined in the V2X message and the information of V2X devices such as driving information and driving intention (e.g., a destination, a driving route, an average walking speed, or a vehicle status) may occur.

In addition, V2X devices may not ensure the same risk prediction performance from the information obtained with the V2X message. For example, a difference in risk prediction ability according to the performance or algorithm of the V2X Application used, power supply restriction and processing capability of a mobile device (a cell phone, a tablet, etc.) operating as a VRU need to be shared with various applications, and thus computation and processing capability fixed to the V2X application may not be ensured. Accordingly, risk prediction performance may be different between the V2X devices.

Due to the asymmetry of information and performance included in such a V2X message, safety gain and/or risk prediction may be different between devices participating in a V2X network.

Therefore, it may be necessary to share risk information dynamically recognized with each other for safety reconsideration of users of V2X devices and/or VRUs on the V2X network. That is, the V2X device that recognizes risk needs to detect the same risk in a target vehicle/VRU by exchanging an event type, an impact range, and target vehicle/VRU information with V2X devices related to the recognized risk. Therefore, it may be necessary to extend a message of the existing CAS/DENS to add a function for defining a dangerous area and designating a target.

First, a V2X communication device may include a PC5/DSRC for performing V2X communication, a Uu (4G, 5G) Interface module, a V2X stack (Network/Transport, Facilities) module for transferring a message through an access layer, a threat assessment module for performing risk analysis through a V2X message, and a message module that specifies a target device for a recognized risk situation, generates/transmits a threat notification service application (a targeted notification message) indicating a damage area, and analyzes the received event.

Based on such a configuration, a method of generating/merging events and designating an event area, a method of generating and transmitting a threat notification message (TNM), a method of receiving a TNM and processing the corresponding event via ID matching, a method of supporting TNM area information GeoCasting (GeoNW) to support V2N2V communication, a method of implementing a low-power VRU device for transmitting a safety message through short-range communication and only receiving a TNM through Uu, and methods for improving response speed by distributing and processing threat assessment and sharing the result with the TNM will be proposed in detail.

Figure 17:
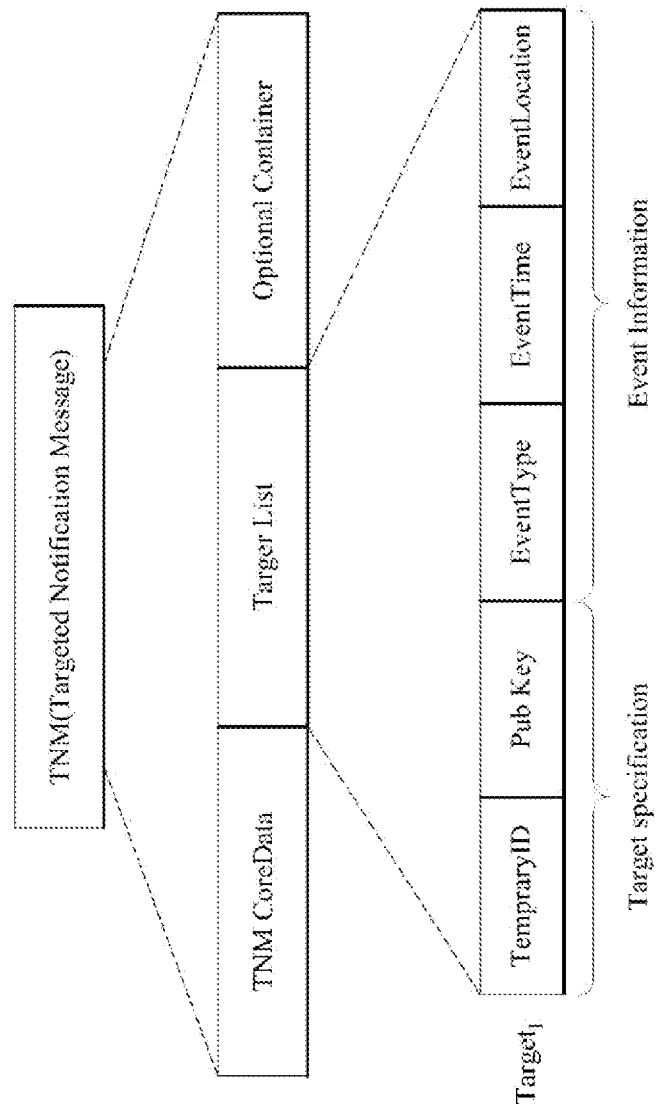
FIG. 17 is a diagram for explaining a method of transmitting a TNM message by a V2X device.

FIG. 17 is a diagram for explaining a method of transmitting a TNM message by a V2X device.

Referring to FIG. 17, the TNM may include a TNM core data frame, a target list frame, and an optional container frame. The target list frame may include a TempraryID frame (or field) and a pub key frame (or field) for information on a target and may include an EventType frame (or field), an EventTime frame (or field), and an EventLocation frame (or field) related to event information.

In this case, when detecting an event related to collision risk, the V2X device (or HV) may broadcast a TNM including the detected event and device information related to the event. The VRU device (or RV) that receives the TNM may perform ID/Key Matching based on target information acquired from TempraryID, and Pub Key frames (or field) included in the target list frame (or field). The RV may perform processing on the acquired event based on EventType, EventTime, and EventLocation field, which correspond to the case in which the event matches an ID/Key of the RV.

Figure 18:
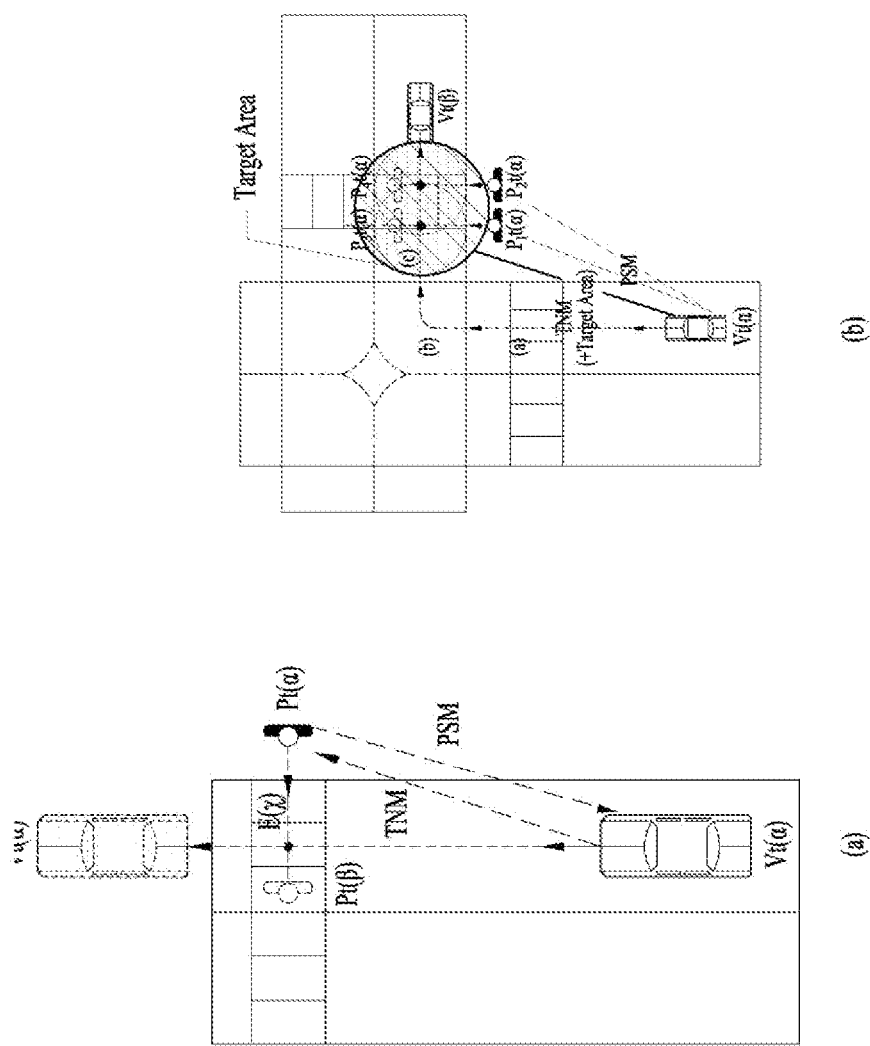
FIG. 18 is a diagram for explaining a method of transmitting a TNM by a V2X device that detects danger.

FIG. 18 is a diagram for explaining a method of transmitting a TNM by a V2X device that detects danger.

Referring to FIG. 18($a$), the V2X device (HV) is moving in Vt($\alpha$)→Vt($\beta$), and the VRU device (RV) is moving in Pt($\alpha$)→Pt($\beta$). In this case, the VRU device (RV) may transmit or broadcast the PSM at a first time (a) to transmit state information of the VRU device to adjacent devices. The V2X device (HV) may evaluate a possibility of collision risk with the VRU device (RV) based on the received PSM and a movement path of the VRU device. When a collision risk with the VRU device (RV) is detected, the V2X device (HV) may transmit a TNM including event information related to collision and information related to the RV. In this case, the VRU device (RV) may attempt to match an ID/key thereof based on the received TNM, and if the VRU device matches the ID/key, the VRU device may process event information included in the TNM.

Alternatively, information related to the TNM may be provided in conjunction with any one of a MCM, a CAM and a DENM. In detail, a data frame of the TNM may be added to a MCM, a CAM, or a DENM as mutually complementary messages with TNM. In this case, data traffic may be significantly reduced compared to the conventional case in which a separate TNM is transmitted. For example, the MCM may include an MCM CoreData field and an Extension Container field, and the Extension Container may include a data frame (TNM core data, a target list, and an optional container field) of the TNM For example, when the V2X device (HV) is moving in a path of Vt($\alpha$)→Vt($\beta$) and the VRU device (RV) is moving in Pt($\alpha$)→Pt($\beta$), the VRU device (RV) may transmit or broadcast the PSM at a first time ($\alpha$) to transmit state information of the VRU device to adjacent devices. The V2X device (HV) may evaluate the possibility of collision risk with the VRU device (RV) based on the received PSM and its movement path. When a collision risk with the VRU device (RV) is detected, the V2X device (HV) may transmit a TNM data frame including event information related to the collision and information related to the RV in the MCM.

Referring to FIG. 18($b$), a plurality of VRU devices (Pt1($\alpha$), Pt2($\alpha$)) may be located within a predetermined area. In this case, the V2X device (HV) may transmit a TNM to a plurality of targets related to the plurality of VRU devices and a target area related thereto.

Figure 19:
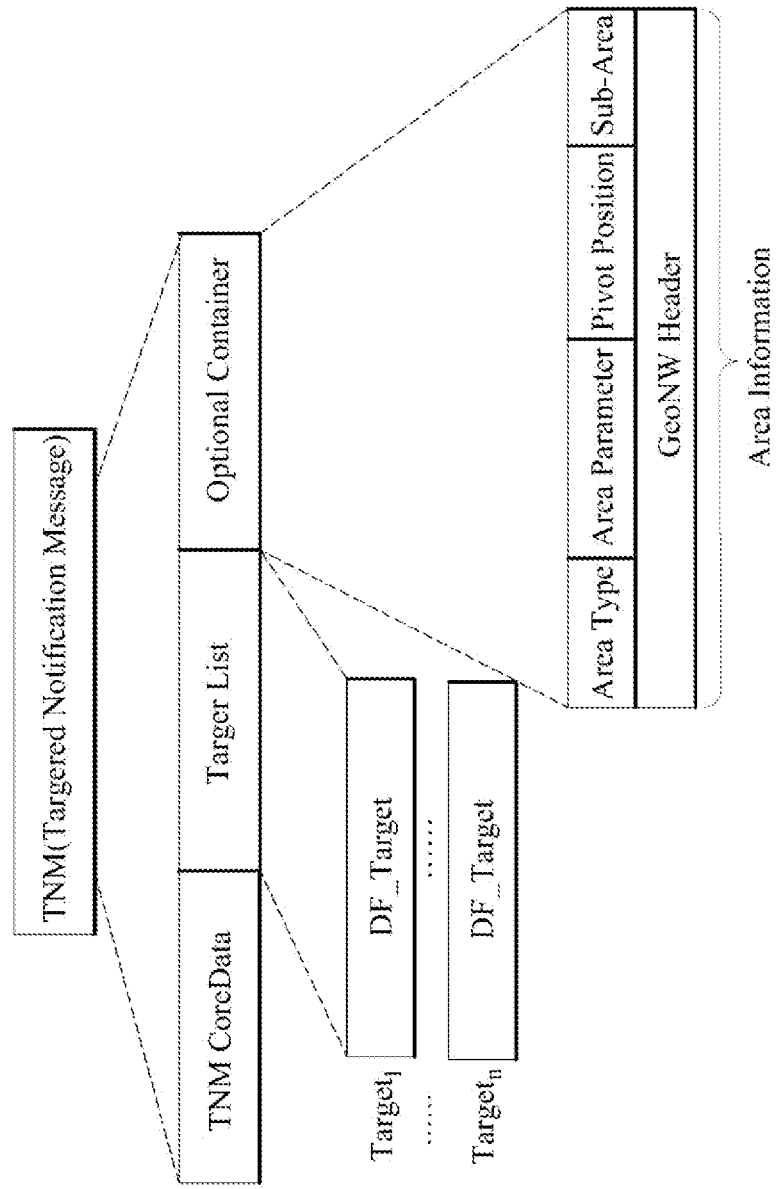
FIG. 19 is a diagram for explaining a structure of a frame of a TNM for multiple notification targets.

In detail, referring to FIG. 19, the V2X device (HV) may transmit a TNM for multiple notification targets based on the following frame structure. A frame of the TNM may include a TNM CoreData frame, a target list frame, and an optional container frame. The target list frame may be configured as arrangement of target lists to process multiple notification targets. That is, in the Target List frame, a DF_Target frame for $Pt_1(\alpha)$ and a DF_Target frame for $Pt_2(\alpha)$ may be arranged.

Then, an area information data frame for configuring a range of an event may be added to the TNM. The area information data frame may include an area type field, an area parameter field, a pivot position field, and a sub-area field. The area information data frame may be included in the optional container frame as shown in FIG. 19. The Area Information Data frame may include configured area information corresponding to each event or may include information on one integrated area when multiple events occur. Specifically, as shown in FIG. 19, a risk area for $Pt_1(\alpha)$ and a risk area for $Pt_2(\alpha)$ may be calculated, and one integrated risk area including reflection of the two risks may be calculated. In this case, the area information data frame may include information on the one integrated risk area.

The area information (or an area information data frame) may be changed to GeoNWHeader for supporting V2N2V support and transmitted to a network.

In detail, referring to FIG. 20, when collision with a specific VRU is predicted, the V2X device (HV) may transmit a first message including Target and GeoNW Header fields corresponding to the TNM through a Uu link to a network (GeoNW). Here, the GeoNW Header field may be defined to include information corresponding to area Information as described above. For example, the first message may include a MAC field, an LLC field, a Target field, and a GeoNW Header field, and the GeoNW Header field may include information corresponding to the TNM. In this case, the network may transmit a message including the TNM to the VRU located in an area where the target is located based on the received GeoNW Header field through the Uu link.

That is, by applying an area information data frame defined in the TNM to a GeoNW Header field without changes, the V2X device (HV) may easily apply area information related to the TNM to V2N2V communication. In addition, since the VRU transmits only a safety message in short-range communication and receives information related to the TNM through the Uu link, it may be possible to minimize power consumption due to the monitoring of the TNM through the short-range communication of the VRU.

Figure 21:
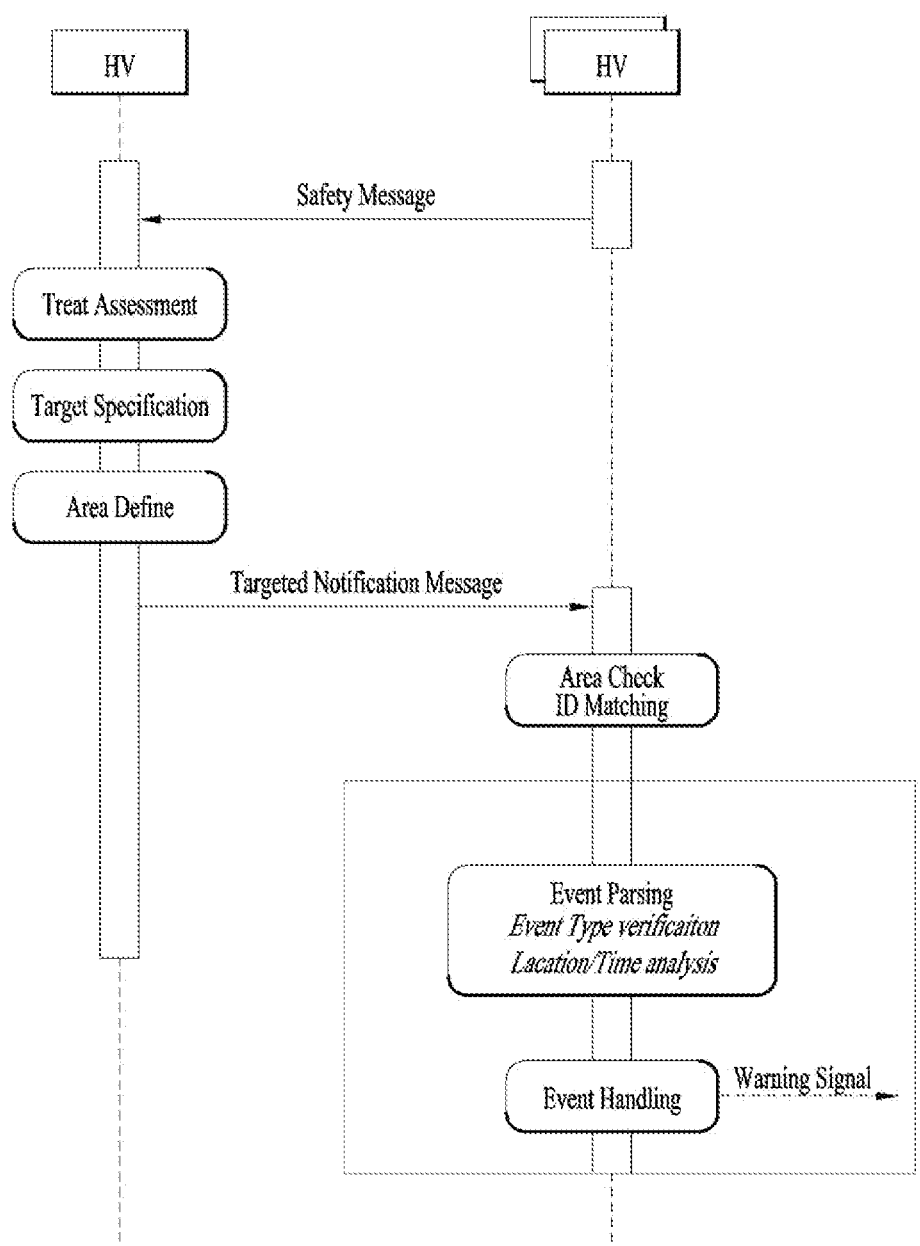
FIG. 21 is a diagram for explaining an operation related to a TNM between a V2X device and a target device.

FIG. 21 is a diagram for explaining an operation related to a TNM between a V2X device and a target device.

Referring to FIG. 21, the V2X device may receive a safety message from the target device. The V2X device may acquire at least one of mobility information (moving speed, moving direction, etc.), identification information, and location information of the target device through the safety message. The V2X device may evaluate the risk of collision with the target device based on the information included in the safety message and its own mobility information. The V2X device may determine identification information (target ID or Key) and a danger area for specifying the target device when collision risk is detected. The V2X device may transmit a TNM including the identification information and the dangerous area information to the target device.

In this case, the target device may match the target ID or Key based on the received TNM or determine whether the target device is located in the dangerous area. When the target device determines that the target ID or key corresponds to its identification information or is located in the dangerous area, the target device may parse a field or frame related to the event included in the received TNM, and may provide a warning message for the event to the user.

Figure 22:
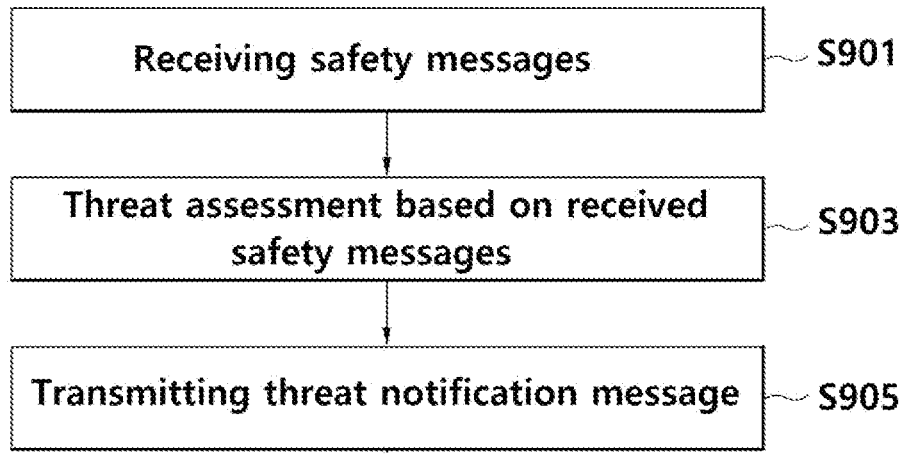
FIG. 22 is a flowchart for explaining a threat notification message by a V2X device.

FIG. 22 is a flowchart for explaining a threat notification message by a V2X device.

Referring to FIG. 22, a first device may receive a safety message from a nearby device (S901). Here, the first device may be a device that supports sidelink communication and is provided in a vehicle. In addition, the safety message may be a personal safety message (PSM) transmitted from a pedestrian, a bicycle, etc., such as a VRU, or a CAM or MCM transmitted from the vehicle. Here, the safety message may include location information, mobility information (speed, movement direction, etc.), and a zone ID of a second device that transmits the safety message, and/or identification information of the device. In addition, the safety message may be repeatedly transmitted at a preset period.

The second device may be a transmitter for transmitting the safety message, and may be a VRU of a pedestrian, a VRU related to a bicycle, or a device provided in a vehicle.

Then, the first device may perform risk assessment related to a possibility of risk, such as collision risk with the first device based on the received safety message (S903). In detail, the first device may evaluate the possibility of collision risk with the second device by estimating a movement path or movement range of the second device based on location information and mobility information included in the safety message, and comparing the estimated movement path (or movement range) and the movement path of the first device. When the possibility of collision risk with the second device is detected, the first device may generate event information including an event type, an event occurrence time, an event occurrence location, and the like, which are related to the collision risk.

The first device may determine or define the dangerous area according to a type of the received safety message and may determine whether the dangerous area information needs to be shared with the second device. For example, when a type of the received safety message is a message transmitted from a VRU that is a device of a pedestrian (a bicycle or a motorcycle), the V2X may additionally determine or define a dangerous area related to the safety message and may share information on the dangerous area with the second device. This is because, since the first device included in the vehicle has relatively higher computational capability than the pedestrian-related VRU and power supply restrictions, which are not high, it is efficient that the first device directly calculates and shares information on the related dangerous area in a relationship with the VRU.

Then, the first device may unicast, multicast or broadcast a threat notification message including identification information (temporary ID or pub key) and the event information of the second device to the second device (S905). Alternatively, the first device may transmit the threat notification message to the GoeNW through a Uu interface of LTE or NR. Alternatively, the first device may provide identification information of the second device to the second device through a shift value of a DMRS sequence included in the threat notification message.

Alternatively, the first device may transmit the threat notification message that further includes information on a dangerous area related to the event information to the second device. In this case, the threat notification message may include a TNM CoreData frame (or field), a target list frame (or field), and an optional container frame (or field) and transmitted to the second device. In this case, identification information of the second device may be included in the target list frame, and the dangerous area information may be included in the optional container frame. The optional container frame including the dangerous area information may be defined as an area information data frame.

Alternatively, the dangerous area may be determined as an area having a radius determined based on mobility information on the first device and mobility information on the second device included in the first safety message. That is, the first device may estimate an expected path of the first device and an expected path of the second device based on the moving speed and moving direction of the first device, and the moving speed and moving direction of the second device, and may determine an area with a high probability of collision based on the estimated expected paths. The area with the high probability of collision may be a circle or an ellipse having a radius determined based on mobility information, or a rectangle having a length determined based on mobility information.

Alternatively, the first device may determine or define the dangerous area according to the type of the received safety message as described above, and include the determined dangerous area in the threat notification message to share the threat assessment information with the second device. In other words, the first device included in the vehicle has relatively higher computational capability than a pedestrian-related device, such as a VRU, and no power supply restrictions, which are not high, and thus may share event information and dangerous area information related to collision, which are directly determined and calculated by the first device with the VRU, as the threat notification message. In this case, the proposed present disclosure may minimize battery consumption of the VRU and may minimize mismatch in safety evaluation due to a difference in computing capability between the VRU and the first device.

Alternatively, the first device has a non-high difference in performance and battery restrictions with the second device when the safety message is a CAM, a DENM, or a MCM by the second device related to the vehicle, and thus the dangerous area information may not be provided to the second device. In this case, the first device may minimize unnecessary computational load and power consumption. That is, when the safety message is a CAM, a DENM, or a MCM by the second device related to a vehicle, the first device may transmit the threat notification message that does not include a dangerous area corresponding to event information related to the second device.

Alternatively, the first device may transmit the threat notification message including the dangerous area information to the second device in order to share the dangerous area defined with each other even if the safety message is a CAM, a DENM, or a MCM by the second device related to the vehicle. In this case, the second device may correct dangerous area information calculated by the second device based on the received dangerous area information. For example, the second device may correct a minimum area including both the received dangerous area and the dangerous area calculated by the second device to a dangerous area having a risk of collision with the first device.

Alternatively, when the first device transmits any one of a maneuver coordination message (MCM), a cooperative awareness message (CAM), and a decentralized environmental notification message (DENM) to reduce a signaling load or data traffic of the communication system, the first device may transmit the threat notification message in a subframe to the second device. In this case, the threat notification message may be configured as a subframe in the MCM, CAM, or DENM frame. For example, when the threat notification message is transmitted through the MCM, the first device may configure an Extension Contanier subframe configuring the MCM as a subframe for the threat notification message.

Alternatively, the first device may perform V2N2V communication (or GeoCasting) with a network. In this case, the first device may include a threat notification message related to the second device in the V2N message or V2N packet related to the GeoCasting in order to use GeoCasting with the network and transmit the same to the second device. In addition, the first device may configure a GeoNWHeader with information on the dangerous area in the V2N packet or V2N message related to the GeoCasting in order to perform a service related to the TNM through V2N2V communication. Here, the dangerous area configured in the GeoNWHeader may include an area type field, an area parameter field, a pivot position field, and a sub-area field as described above.

In this case, the network that receives the GeoNWHeader including the dangerous area information may recognize that a message or a packet transmitted by the first device based on the GeoNWHeader is a TNM-related message or packet that needs to be transmitted to a specific device and may transfer the message or the packet to a BS or RSU located in a location corresponding to a dangerous area included in the GeoNWHeader. The BS or the RSU may transfer a threat notification message including information on the GeoNW-Header and the target to the second device through a Uu link. That is, the threat notification message may be transferred to the second device through a Uu link rather than short-range broadcasting (or PC5 interface). In this case, the second device, which is a device such as a VRU, may only transmit the safety message through short-range broadcasting (or PC5 interface) and may receive a response message related to the safety message (e.g., a safety message of another device or the threat notification message) through the Uu link. In this case, since the second device having large battery restrictions does not need to perform monitoring of the threat notification message through short-range broadcasting (or PC5 interface), battery consumption may be minimized.

Alternatively, the safety message may further include indication information indicating that the second device does not receive a message through short-range broadcasting or indication information indicating whether the threat notification message is received through a uU interface. In this case, the first device may determine whether to transmit the threat notification message related to the second device through short-range broadcasting or GeoCasting through the uU interface based on the safety message. Alternatively, the first device may transmit a threat notification message related to the second device based on the safety message regardless of the indication information using each of short-range broadcasting (or sidelink communication) and Geo-Casting (or Uu link). That is, while transmitting the threat notification message using a sidelink, the first device may transmit the threat notification message in a V2N message related to GeoCasting to the network.

Alternatively, the first device may receive a plurality of safety messages from a plurality of devices within a predetermined time. In this case, the first device may not separately transmit a threat notification message corresponding to each of the plurality of safety messages, but may transmit one integrated threat notification message based on the mobility information and location information of the plurality of devices to the plurality of devices. The one integrated threat notification message may include information on one dangerous area integrated based on the event information and the dangerous area determined for each of the plurality of safety messages.

In detail, the first device may receive a first safety message from the second device and a second safety message from a third device. The first device may generate first event information and second event information by evaluating a possibility of collision risk for each of the first safety message and the second safety message. The first device may configure a first dangerous area and a second dangerous area based on the first event information and the second event information.

In this case, the first device may determine whether to integrate and transmit the threat notification message for the second device and the third device according to whether the first dangerous area and the second dangerous area overlap. In detail, when the first dangerous area and the second dangerous area overlap, an integrated dangerous area including both the first dangerous area and the second dangerous area may be determined, and a threat notification message including information on the integrated dangerous area may be transmitted to the second and third devices. The first device may include both identification information for the second device and the third device in the threat notification message to inform that the threat notification message includes the integrated event information and the dangerous area.

Alternatively, the first device may determine whether to integrate and transmit the threat notification message of the second device and the third device according to an overlap ratio between the first dangerous area and the second dangerous area. In detail, when the first dangerous area and the second dangerous area overlap more than a preset ratio, the first device may determine an integrated dangerous area including both the first dangerous area and the second dangerous area, and transmit a threat notification message including information on the integrated dangerous area to the second and third devices. In addition, the first device may include both identification information for the second device and the third device in the threat notification message to inform that the threat notification message includes the integrated event information and the dangerous area.

The integrated dangerous area may be determined as an area including both the first dangerous area and the second dangerous area. For example, when the first dangerous area and the second dangerous area are circular regions, the integrated dangerous area may be determined as one circular region inscribed with each of the first dangerous area and the second dangerous area. The first device may indicate whether dangerous area information obtained by integrating the first dangerous area and the second dangerous area is included in the threat notification message through a shift value of a DMRS sequence included in the threat notification message. That is, when the shift value of the DMRS sequence included in the threat notification message corresponds to a predetermined specific shift value, the second device and the third device may recognize that the dangerous area is an integrated dangerous area of two or more dangerous areas.

The first device may correct the integrated dangerous area based on a difference in reception timing between the first safety message and the second safety message. For example, when a difference in reception timing between the first safety message and the second safety message is greater than or equal to a predetermined threshold time, the integrated dangerous area may be increased by a predetermined ratio in consideration of the fact that association between the first dangerous area and the second dangerous area is greatly reduced.

Alternatively, the first device may correct the integrated dangerous area based on a geographic or weather environment of each of the first dangerous area and the second dangerous area. For example, when the first device determines one integrated dangerous area including both the first dangerous area and the second dangerous area, the first device may increase the determined integrated dangerous area by a predetermined ratio when the first dangerous area and the second dangerous area include or are adjacent to a crosswalk. Alternatively, the first device may increase the determined integrated dangerous area by a preset ratio when the current weather environment is bad (rain, snow, fog, or night).

In contrast, when the first dangerous area and the second dangerous area do not overlap, the first device may generate and separately transmit a threat notification message for the first device and a threat notification message for the second device.

Communication System Example to which the Present Disclosure is Applied

Although not limited thereto, various descriptions, functions, procedures, proposals, methods, and/or operational flow charts of the present disclosure disclosed in this document can be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 23:
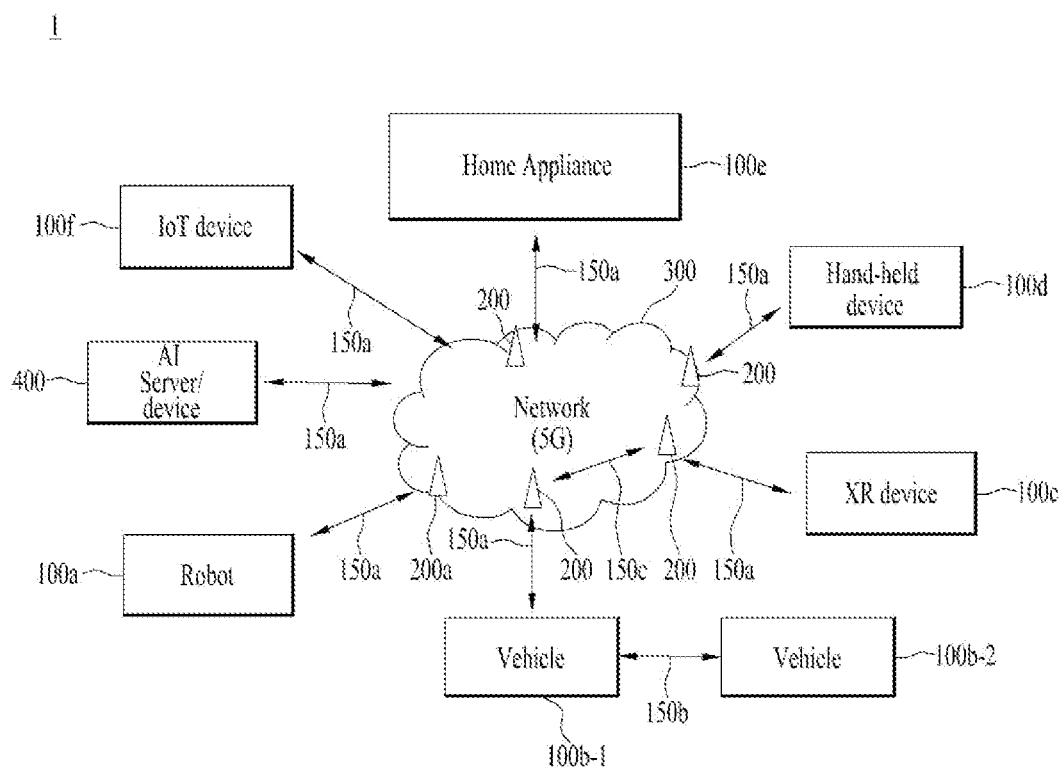
FIG. 23 illustrates a communication system applied to the present disclosure.

FIG. 23 illustrates a communication system applied to the present disclosure.

Referring to FIG. 23, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 24:
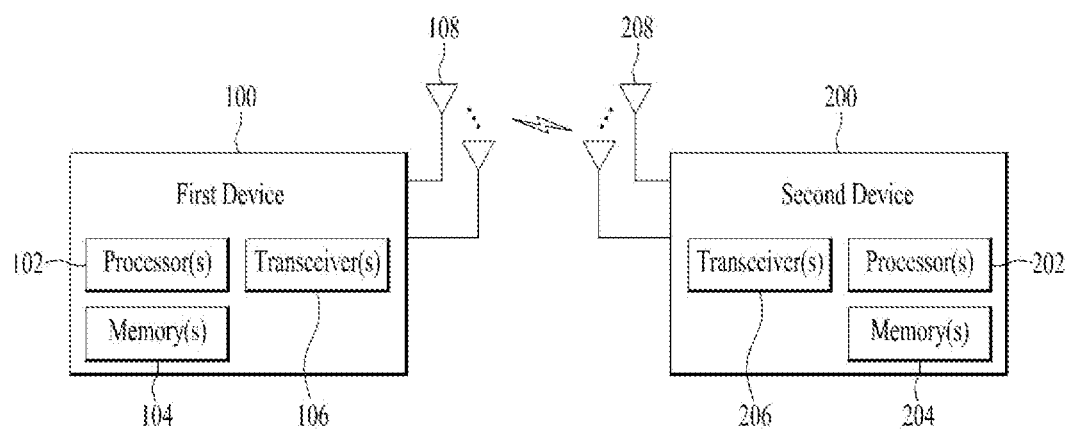
FIG. 24 illustrates wireless devices applicable to the present disclosure.

FIG. 24 illustrates a wireless device applicable to the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the first device may include the processor 102 and the memory 104 that are connected to the RF transceiver. The memory 104 may include at least one program for executing an operation related to the embodiments described with reference to FIGS. 15 to 22. The processor 102 may receive a first safety message from a second device using the RF transceiver, may evaluation a collision risk based on the first safety message, may generate first event information based on the collision risk evaluation, and may transmit a threat notification message (TNM) including identification information and the first event information of the second device using the RF transceiver. When the first safety message is a personal safety message (PSM), the processor 102 may further include information on the first dangerous area determined in response to the first event information in the threat notification message.

Alternatively, a chip set including the processor 102 and the memory 104 may be configured. The memory 104 may include at least one program for executing an operation related to the embodiments described with reference to FIGS. 15 to 22. The processor 102 may transmit a TNM based on the at least one program stored in the memory.

Another aspect of the present disclosure may provide a computer-readable storage medium including at least one program for executing an operation by the at least one processor when being executed, and in this case, the operation includes receiving a first safety message from a second device using the RF transceiver, evaluating a collision risk based on the first safety message, generating first event information based on the collision risk evaluation, and transmitting a threat notification message (TNM) including identification information of the second device and the first event information using the RF transceiver, and when the first safety message is a personal safety message (PSM), information on the first dangerous area determined in response to the first event information may be further included in the threat notification message.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 25:
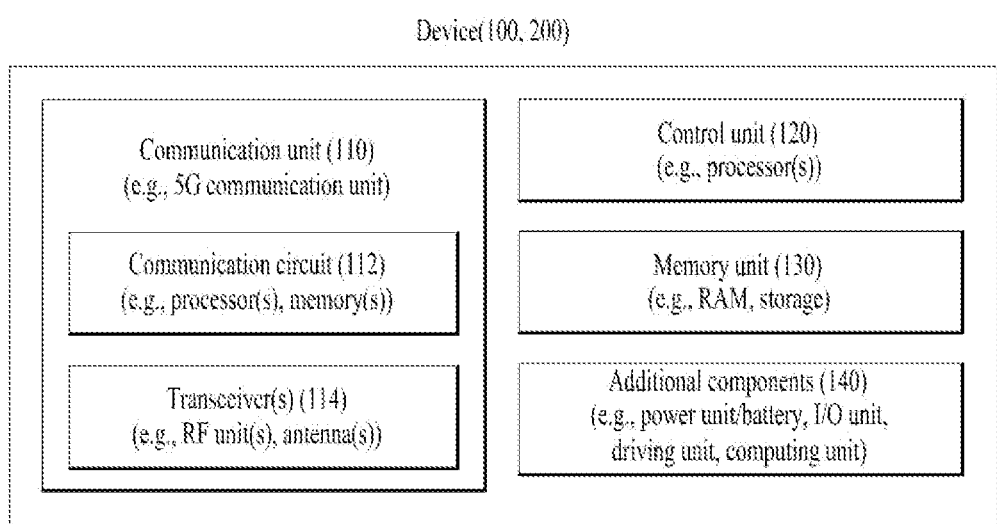
FIG. 25 illustrates another example of a wireless device to which the present disclosure is applied. The wireless device may be implemented in various forms according to use-examples/services.

FIG. 25 illustrates another example of a wireless device applied to the present disclosure. The wireless device may be implemented in various forms according to a use-case/service (refer to FIG. 23)

Referring to FIG. 25, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 23), the vehicles (100b-1 and 100b-2 of FIG. 23), the XR device (100c of FIG. 23), the hand-held device (100d of FIG. 23), the home appliance (100e of FIG. 23), the IoT device (100f of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Examples of Mobile Devices to which the Present Disclosure is Applied

Figure 26:
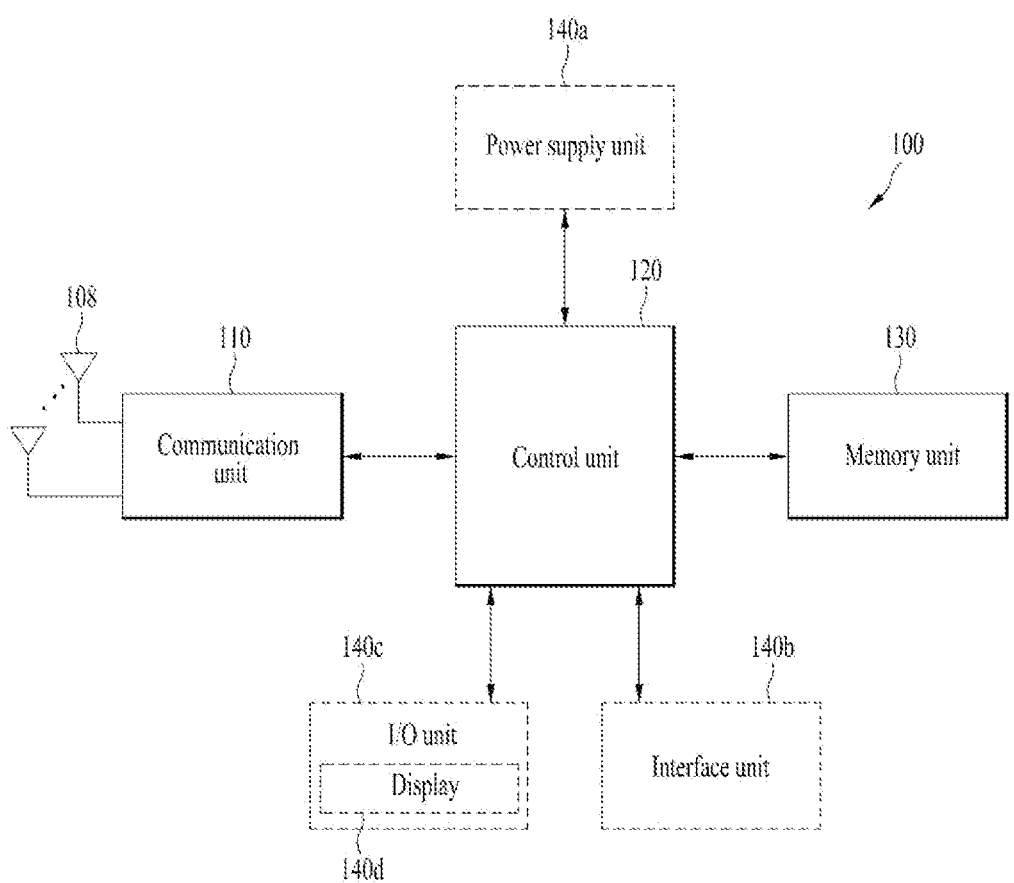
FIG. 26 illustrates a hand-held device applied to the present disclosure.

FIG. 26 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
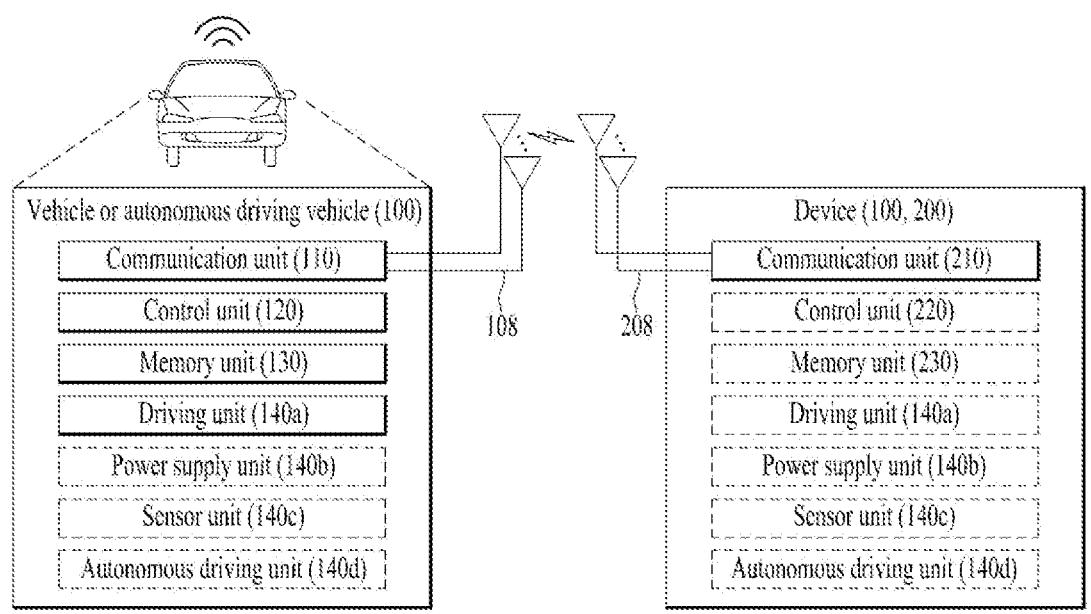
FIG. 27 illustrates a vehicle or an autonomous driving vehicle applied to the present disclosure.

Examples of Vehicles or Autonomous Vehicles to which the Present Disclosure is Applied FIG. 27 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 27, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL AVAILABILITY

The above-described embodiments of the present disclosure are applicable to various mobile communication systems.

What is claimed is:
1. A method of transmitting a message by a first device in a wireless communication system for supporting a direct communication between devices, the method comprising:
  receiving configuration information related to the direct communication,
  wherein the configuration information includes information on a type of synchronization source, a time offset and a resource pool related to the direct communication;
  receiving a first message from a second device based on the configuration information;
  selecting a transmission resource within the resource pool; and
  transmitting a second message in the selected transmission resource,
  wherein the first message is received through at least one of a physical shared channel for the direct communication and a physical control channel for the direct communication,
  wherein the second message is transmitted through at least one of the physical shared channel for the direct communication and the physical control channel for the direct communication, wherein the physical control channel for the direct communication includes resource allocation information for the physical shared channel for the direct communication, and Modulation Coding Scheme (MCS) information, wherein the first device performs a collision risk assessment based on the first message, and transmits the second message including first event information related to the collision risk assessment and identification information for the second device, and wherein, based on a type of the first message being a personal safety message (PSM), the second message further includes information on a first dangerous area related to the first event information.

2. The method of claim 1, wherein the second message is included in a vehicle to network (V2N) message related to GeoCasting and is transferred to the second device through a network, and wherein the V2N message includes information on the first dangerous area as GeoNWHeader.

3. The method of claim 2, wherein the first device determines whether to transmit the second message through the vehicle to network (V2N) message based on indication information related to reception of a Threat Notification Message (TNM) included in the first message.

4. The method of claim 2, wherein the first device transmits the second message to the second device using each of the vehicle to network (V2N) message and the direct communication.

5. The method of claim 1, wherein, based on the type of the first message being a cooperative awareness message (CAM) of a vehicle, the second message does not include information on the first dangerous area.

6. The method of claim 1, wherein the second message is transmitted in any one of a maneuver coordination message (MCM), a cooperative awareness message (CAM), and a decentralized environmental notification message (DENM).

7. The method of claim 1, wherein the first dangerous area is determined as an area having a radius determined based on mobility information of the first device and mobility information for the second device, included in the first message.

8. The method of claim 1, further comprising:
receiving a third message from a third device and generating second event information of the third message; and
based on a second dangerous area corresponding to the second event information overlapping the first dangerous area, integrating the first dangerous area and the second dangerous area.

9. The method of claim 8, wherein the second message includes identification information of the second device, identification information of the third device, and integrated dangerous area information in which the first dangerous area and the second dangerous area are integrated.

10. The method of claim 9, wherein a size of a range of the integrated dangerous area is corrected based on a reception timing interval between the first message and the third message.

11. The method of claim 9, wherein a size of a range of the integrated dangerous area is corrected based on a surrounding environment related to the first dangerous area and the second dangerous area.

12. The method of claim 1, wherein the second message includes a Threat Notification Message (TNM) CoreData frame, a target list frame, and an optional container frame, and wherein information on the first dangerous area is included in the optional container frame.

13. A first device for transmitting a message in a wireless communication system for supporting a direct communication between devices, comprising:
a radio frequency (RF) transceiver; and
a processor connected to the RF transceiver,
wherein the processor control to the RF transceiver to receive configuration information related to the direct communication, wherein the configuration information includes information on a type of synchronization source, a time offset and a resource pool related to the direct communication, receive a first message from a second device based on the configuration information, select a transmission resource within the resource pool, transmit a second message in the selected transmission resource,
wherein the first message is received through at least one of a physical shared channel for the direct communication and a physical control channel for the direct communication,
wherein the second message is transmitted through at least one of the physical shared channel for the direct communication and the physical control channel for the direct communication,
wherein the physical control channel for the direct communication includes resource allocation information for the physical shared channel for the direct communication, and Modulation Coding Scheme (MCS) information,
wherein the processor performs a collision risk assessment based on the first message, and control to the RF transceiver to transmit the second message including first event information related to the collision risk assessment and identification information for the second device, and
wherein, based on a type of the first message being a personal safety message (PSM), the second message further includes information on a first dangerous area related to the first event information.

14. A chip set for transmitting a message in a wireless communication system for supporting a direct communication between devices, comprising:
at least one processor; and
at least one processor operatively connected to the at least one processor and configured to cause the at least one processor to perform an operation when being executed,
wherein the operation includes:
receiving configuration information related to the direct communication,
wherein the configuration information includes information on a type of synchronization source, a time offset and a resource pool related to the direct communication;
receiving a first message from a second device based on the configuration information;
selecting a transmission resource within the resource pool; and
transmitting a second message in the selected transmission resource,
wherein the first message is received through at least one of a physical shared channel for the direct communication and a physical control channel for the direct communication, wherein the second message is transmitted through at least one of the physical shared channel for the direct communication and the physical control channel for the direct communication, wherein the physical control channel for the direct communication includes resource allocation information for the physical shared channel for the direct communication, and Modulation Coding Scheme (MCS) information, wherein the at least one processor performs a collision risk assessment based on the first message, and transmits the second message including first event information related to the collision risk assessment and identification information for the second device, and wherein, based on a type of the first message being a personal safety message (PSM), the second message further includes information on a first dangerous area related to the first event information.

\* \* \* \* \*